US011215829B2

(12) United States Patent
Topliss et al.

(10) Patent No.: US 11,215,829 B2
(45) Date of Patent: Jan. 4, 2022

(54) DISPLAY DEVICE WITH A HOLOGRAPHIC COMBINER

(71) Applicant: Apple Inc., Cupertino, CA (US)

(72) Inventors: Richard J. Topliss, Campbell, CA (US); Paul J. Gelsinger-Austin, Santa Clara, CA (US); Thomas M. Gregory, Cupertino, CA (US); Richard H. Tsai, Cupertino, CA (US); Alexander Shpunt, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/359,924

(22) Filed: Mar. 20, 2019

(65) Prior Publication Data
US 2019/0285897 A1 Sep. 19, 2019

Related U.S. Application Data

(63) Continuation of application No. PCT/US2017/052573, filed on Sep. 20, 2017, which
(Continued)

(51) Int. Cl.
*G09G 5/00* (2006.01)
*G02B 27/01* (2006.01)
(Continued)

(52) U.S. Cl.
CPC ..... *G02B 27/0172* (2013.01); *G02B 27/0093* (2013.01); *G02B 27/0176* (2013.01);
(Continued)

(58) Field of Classification Search
CPC ................................................. G02B 27/0103
See application file for complete search history.

(56) References Cited

U.S. PATENT DOCUMENTS

| 8,120,828 B2 | 2/2012 | Schwerdtner |
| 8,233,204 B1 * | 7/2012 | Robbins ............. G02B 27/0149 359/15 |

(Continued)

FOREIGN PATENT DOCUMENTS

| EP | 0574005 | 12/1993 |
| WO | 2017059379 | 6/2017 |
| WO | 201857660 | 3/2018 |

OTHER PUBLICATIONS

Hua et al., A high-resolution optical see-through head-mounted display with eyetracking capability, Dec. 9, 2013, Optics Express, vol. 21, No. 25, pp. 1-6. (Year: 2013).*
(Continued)

*Primary Examiner* — Kirk W Hermann
(74) *Attorney, Agent, or Firm* — Robert C. Kowert; Kowert, Hood, Munyon, Rankin & Goetzel, P.C.

(57) ABSTRACT

An augmented reality headset may include a reflective holographic combiner to direct light from a light engine into a user's eye while also transmitting light from the environment. The combiner and engine may be arranged to project light fields with different fields of view and resolution to match the visual acuity of the eye. The combiner may be recorded with a series of point to point holograms; one projection point interacts with multiple holograms to project light onto multiple eye box points. The engine may include a laser diode array, a distribution waveguide, scanning mirrors, and layered waveguides that perform pupil expansion and that emit wide beams of light through foveal projection points and narrower beams of light through peripheral projection points. The light engine may include focusing elements to focus the beams such that, once reflected by the holographic combiner, the light is substantially collimated.

20 Claims, 31 Drawing Sheets

Related U.S. Application Data is a continuation of application No. 15/709,398, filed on Sep. 19, 2017, now abandoned.

(60) Provisional application No. 62/397,312, filed on Sep. 20, 2016.

(51) Int. Cl.
*G02B 27/00* (2006.01)
*G06T 19/00* (2011.01)

(52) U.S. Cl.
CPC .... *G06T 19/006* (2013.01); *G02B 2027/0105* (2013.01); *G02B 2027/0107* (2013.01); *G02B 2027/0125* (2013.01); *G02B 2027/0174* (2013.01); *G02B 2027/0178* (2013.01); *G02B 2027/0187* (2013.01)

(56) References Cited

U.S. PATENT DOCUMENTS

| | | | |
|---|---|---|---|
| 8,686,923 B2 | 4/2014 | Eberl et al. | |
| 9,427,154 B2 | 8/2016 | Eberl et al. | |
| 9,594,247 B2 | 3/2017 | Maimone et al. | |
| 9,846,307 B2 | 12/2017 | Tremblay et al. | |
| 9,904,051 B2 | 2/2018 | Aleem et al. | |
| 9,989,764 B2 | 6/2018 | Alexander et al. | |
| 2006/0268421 A1* | 11/2006 | Shimizu | G02B 27/0172 359/630 |
| 2010/0149073 A1* | 6/2010 | Chaum | G02B 27/0093 345/8 |
| 2011/0157667 A1 | 6/2011 | Lacoste et al. | |
| 2013/0278631 A1 | 10/2013 | Border et al. | |
| 2014/0104664 A1* | 4/2014 | Lee | G03H 1/2294 359/9 |
| 2015/0185481 A1* | 7/2015 | Hiraide | G02B 27/0172 359/630 |
| 2015/0235463 A1 | 8/2015 | Schowengerdt | |
| 2016/0026253 A1* | 1/2016 | Bradski | H04N 13/344 345/8 |
| 2016/0033771 A1* | 2/2016 | Tremblay | G02B 26/10 345/8 |
| 2016/0089024 A1 | 3/2016 | Katashiba | |
| 2016/0238845 A1* | 8/2016 | Alexander | G03H 1/2645 |
| 2016/0238921 A1* | 8/2016 | Rossini | G02B 5/32 |
| 2016/0349514 A1* | 12/2016 | Alexander | G06F 3/013 |
| 2017/0082855 A1* | 3/2017 | Christmas | G02B 30/52 |
| 2017/0202457 A1 | 7/2017 | Swan et al. | |
| 2017/0212471 A1* | 7/2017 | Ogasawara | G03H 1/268 |
| 2017/0214907 A1 | 7/2017 | Lapstun | |
| 2017/0299870 A1 | 10/2017 | Urey et al. | |
| 2017/0299956 A1* | 10/2017 | Holland | H01S 5/02 |
| 2018/0107103 A1 | 4/2018 | Holland et al. | |
| 2018/0246336 A1 | 8/2018 | Greenberg | |
| 2018/0284440 A1* | 10/2018 | Popovich | G02B 27/0093 |
| 2019/0129201 A1* | 5/2019 | Montalban | G02C 5/2227 |

OTHER PUBLICATIONS

U.S. Appl. No. 16/056,198, filed Aug. 6, 2018, Richard J. Topliss.
U.S. Appl. No. 16/526,896, filed Jul. 30, 2019, Richard J. Topliss.

\* cited by examiner

DISPLAY DEVICE WITH A HOLOGRAPHIC COMBINER

This application is a continuation of International Application No. PCT/US2017/052573, filed Sep. 20, 2017, which claims benefit of priority to U.S. application Ser. No. 15/709,398, filed Sep. 19, 2017, which is abandon, which claims benefit of priority to U.S. Provisional Application No. 62/397,312, filed Sep. 20, 2016. The above applications are incorporated herein by reference. To the extent that any material in the incorporated application conflicts with material expressly set forth herein, the material expressly set forth herein controls.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, augmented reality (AR) and mixed reality (MR) combine computer generated information with views of the real world to augment, or add content to, a user's view of their environment. The simulated environments of VR and/or the enhanced content of AR/MR may thus be utilized to provide an interactive user experience for multiple applications, such as interacting with virtual training environments, gaming, remotely controlling drones or other mechanical systems, viewing digital media content, interacting with the internet, or the like.

However, conventional VR, AR, and MR systems may suffer from accommodation-convergence mismatch problems that cause eyestrain, headaches, and/or nausea.

Accommodation-convergence mismatch arises when a VR or AR system effectively confuses the brain of a user by generating scene content that does not match the depth expected by the brain based on the stereo convergence of the two eyes of the user. For example, in a stereoscopic system the images displayed to the user may trick the eye(s) into focusing at a far distance while an image is physically being displayed at a closer distance. In other words, the eyes may be attempting to focus on a different image plane or focal depth compared to the focal depth of the projected image, thereby leading to eyestrain and/or increasing mental stress. Accommodation-convergence mismatch problems are undesirable and may distract users or otherwise detract from their enjoyment and endurance levels (i.e. tolerance) of virtual reality or augmented reality environments.

SUMMARY

Various embodiments of an augmented reality (AR), and/or mixed reality (MR) direct retinal projector system that may include an AR headset (e.g., a helmet, goggles, or glasses) that uses a reflective holographic combiner to direct light from a light engine into the user's eye, while also transmitting light from the user's environment to thus provide an augmented view of reality. The holographic combiner may be recorded with a series of point to point holograms; one projection point interacts with multiple holograms to project light onto multiple eye box points. The holograms may be arranged so that neighboring eye box points are illuminated from different projection points. The holographic combiner and light engine may be arranged to separately project light fields with different fields of view and resolution that optimize performance, system complexity and efficiency, so as to match the visual acuity of the eye. The light engine may implement foveal projectors that generally project wider diameter beams over a smaller central field of view, and peripheral projectors that generally project smaller diameter beams over a wider field of view.

The light engine may include multiple independent light sources (e.g., laser diodes, LEDs, etc.) that can independently project from the different projection points, with a proportion being foveal projectors and a proportion being peripheral projectors. In some embodiments, the light engine may include two or more two-axis scanning mirrors to scan the light sources; the light sources are appropriately modulated to generate the desired image. The light engine may include a series of optical waveguides with holographic or diffractive gratings that move the light from the light sources to generate beams at the appropriate angles and positions to illuminate the scanning mirrors; the light is then directed into additional optical waveguides with holographic film layers recorded with diffraction gratings to expand the projector aperture and to maneuver the light to the projection positions required by the holographic combiner.

In some embodiments, the light engine may include at least one focusing element (e.g., optical lens, holographic lens, etc.) for each projector to focus emitted light beams such that, once reflected off the holographic combiner, the light is substantially collimated when it enters the subject's eye. The required focal surface may be complicated by the astigmatism of the holographic combiner, but is a curved surface in front of the combiner. The ideal focal surface is different for different eye box positions, and errors may lead to less collimated output. However, in some embodiments, this can be compensated by reducing the beam diameter for different angles where the errors between the ideal focal surface and the actual best fit focal surface are greatest, which alleviates the problem by increasing the F-number and hence the depth of focus of the beam.

In some embodiments, active beam focusing elements may be provided for each projection point. This may reduce or eliminate the need to change beam diameter with angle. This may also enable beams that diverge into the eye to, rather than being collimated, match the beam divergence of the supposed depth of the virtual object(s) being projected by the light engine.

The AR system may not require extra moving parts or mechanically active elements to compensate for the eye changing position in the eye box or for the changing optical power from the holographic combiner during the scan, which simplifies the system architecture when compared to other direct retinal projector systems. Further, the holographic combiner may be implemented by a relatively flat lens when compared to curved reflective mirrors used in other direct retinal projector systems.

Figure 1:
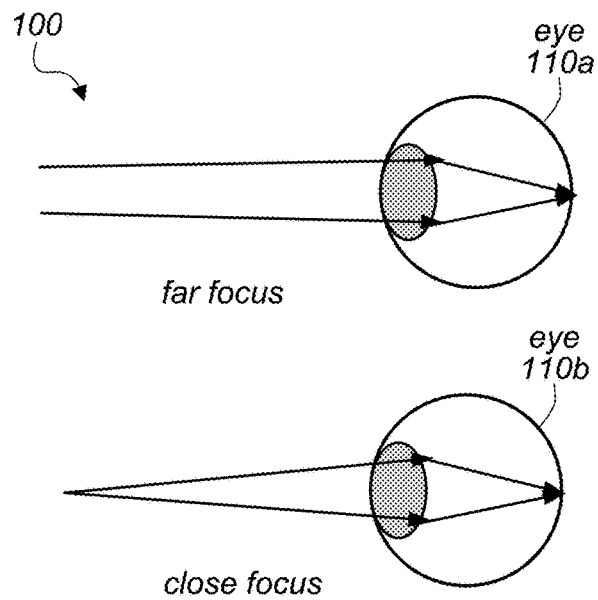
FIG. 1 is an example of different types of eye focus.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of an augmented reality (AR), and/or mixed reality (MR) direct retinal projector system are described that may, for example, resolve the convergence-accommodation conflict in head-mounted AR, MR, and VR systems. While at least some embodiments may provide mixed reality, for simplicity the system may generally be referred to herein as an AR system. Embodiments of an AR headset (e.g., a helmet, goggles, or glasses) are described that may include or implement different techniques and components of the AR system. In some embodiments, an AR headset may include a reflective holographic combiner to direct light from a projector light engine into the user's eye, while also transmitting light from the user's environment to thus provide an augmented view of reality. In some embodiments, the holographic combiner may be recorded with a series of point to point holograms; one projection point interacts with multiple holograms to project light onto multiple eye box points. In some embodiments, the holograms are arranged so that neighboring eye box points are illuminated from different projection points.

In some embodiments, the holographic combiner and light engine may be arranged to separately project light fields with different fields of view and resolution that optimize performance, system complexity and efficiency, so as to match the visual acuity of the eye. In some embodiments, the light engine may include foveal projectors that generally project wider diameter beams over a smaller central field of view, and peripheral projectors that generally project smaller diameter beams over a wider field of view.

In some embodiments, the light engine may include multiple independent light sources (e.g., laser diodes, LEDs, etc.) that can independently project from the different projection points, with a proportion being foveal projectors and a proportion being peripheral projectors. In some embodiments, the light engine includes two or more two-axis scanning mirrors to scan the light sources; the light sources are appropriately modulated to generate the desired image. In some embodiments, the light engine includes a series of optical waveguides with holographic or diffractive gratings that move the light from the light sources to generate beams at the appropriate angles and positions to illuminate the scanning mirrors; the light is then directed into additional optical waveguides with holographic film layers recorded with diffraction gratings to expand the projector aperture and to maneuver the light to the projection positions required by the holographic combiner.

In some embodiments, the light engine includes a lens for each projector to focus emitted light beams such that, once reflected off the holographic combiner, the light is substantially collimated again when it enters the subject's eye. The required focal surface may be complicated by the astigmatism of the holographic combiner, but is a curved surface in front of the combiner. The ideal focal surface is different for different eye box positions, and errors may lead to less collimated output. However, in some embodiments, this can be compensated by reducing the beam diameter for different angles where the errors between the ideal focal surface and the actual best fit focal surface are greatest, which alleviates the problem by increasing the F-number and hence the depth of focus of the beam. In some embodiments, these features may be incorporated into a holographic lens.

In some embodiments, active beam focusing elements may be provided for each projection point. This may reduce or eliminate the need to change beam diameter with angle. This may also enable beams that diverge into the eye to, rather than being collimated, match the beam divergence of the supposed depth of the virtual object(s) being projected by the light engine.

With the methods and apparatus presented above, the AR system may not require extra moving parts or mechanically active elements to compensate for the eye changing position in the eye box or for the changing optical power from the holographic combiner during the scan, which simplifies the system architecture when compared to other direct retinal projector systems.

Accommodation and Convergence in AR/VR Systems

The human brain typically uses two cues to gauge distance: accommodation (i.e., eye focus) and eye convergence (i.e., the stereoscopic perspective difference between the two eyes). Conventional near-eye systems typically use separate miniature screens for each respective eye to project the images intended for the left eye and the right eye, as well as optics to allow a user to comfortably focus the eyes at a far distance during viewing of the left eye and right eye images. Conventional near-eye systems thus produce conflicting visual cues since the resulting three-dimensional (3D) image produced by the brain effectively appears at a convergence distance that is closer than the accommodation distance that each eye focuses on separately, thereby leading to the possibility of headache and/or nausea over time. Heavy users of conventional systems may potentially train themselves to compensate for accommodation-convergence mismatch, but a majority of users might not.

AR systems typically add information and graphics to an existing scene being viewed by a user. In some embodiments, AR may be a powerful experience, since the user can see both the projected images and/or sprites (i.e., the augmented world) as well as the surrounding scene (i.e., the real world) directly through the AR system rather than using camera systems to project a version of the surrounding scene less accurately onto screen displays for each eye.

FIG. 1 depicts an example of different types of eye focus. In system 100 of FIG. 1, an eye 110A may be selectively configured to focus at a far distance, as shown by the incident light originating from a distant location and focusing onto the retina (i.e., the back internal surface) of eye 110A by the internal lens of eye 110A. In another embodiment, eye 110A may instead be selectively configured for a close focus scenario, as shown by light from a nearby location being incident upon the eye and focusing onto the retina.

Figure 2:
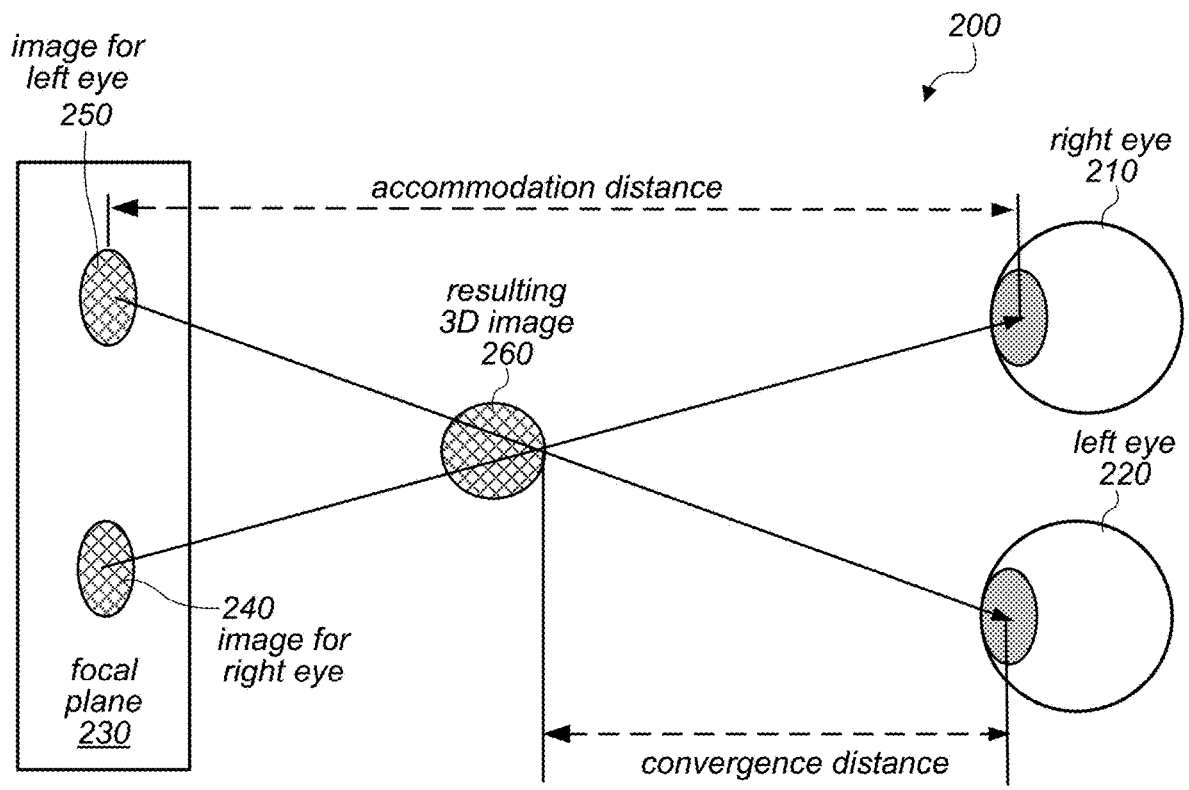
FIG. 2 illustrates one embodiment of a conventional near-eye virtual reality system.

FIG. 2 illustrates one embodiment of a conventional near-eye system 200. As depicted, right eye 210 and left eye 220 are focused on a focal plane 230 where an image for right eye 240 and an image for left eye 250, respectively, are displayed. As right eye 210 and left eye 220 focus on their respective images on focal plane 230, the brain of the user combines the images into a resulting 3D image 260. In one embodiment, the accommodation distance may be the distance between focal plane 230 and an eye of the user (e.g., right eye 210 and/or left eye 220), and the convergence distance may be the distance between resulting 3D image 260 and an eye of the user. Since, as depicted in FIG. 2, the accommodation distance differs from the convergence distance, conventional near-eye system 200 therefore results in an accommodation-convergence mismatch and may cause discomfort for the user as described above.

Figure 3:
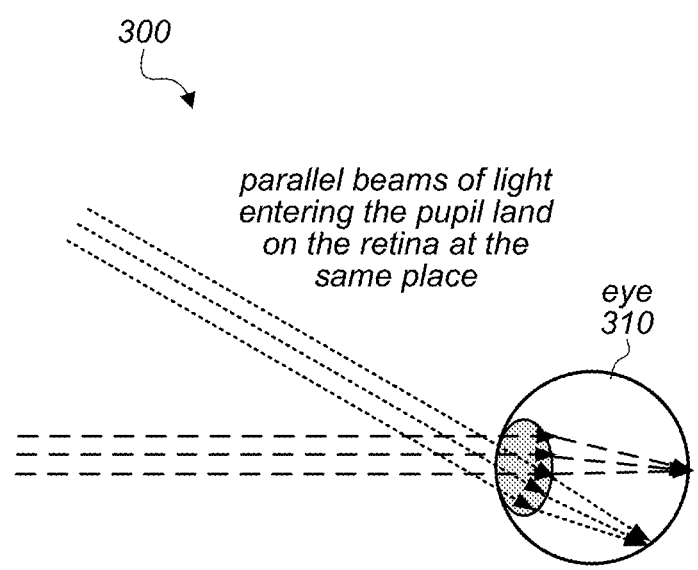
FIG. 3 illustrates an example of parallel light beams entering an eye.

FIG. 3 illustrates an example of parallel light beams entering an eye 300. As shown, various sets of parallel light beams that enter eye 300 are focused by eye 300 such that the parallel beams within a respective set land at the same place on the retina of eye 300.

Direct Retinal Projector System with Scanning Mirror and Ellipsoid Mirror

Figure 4:
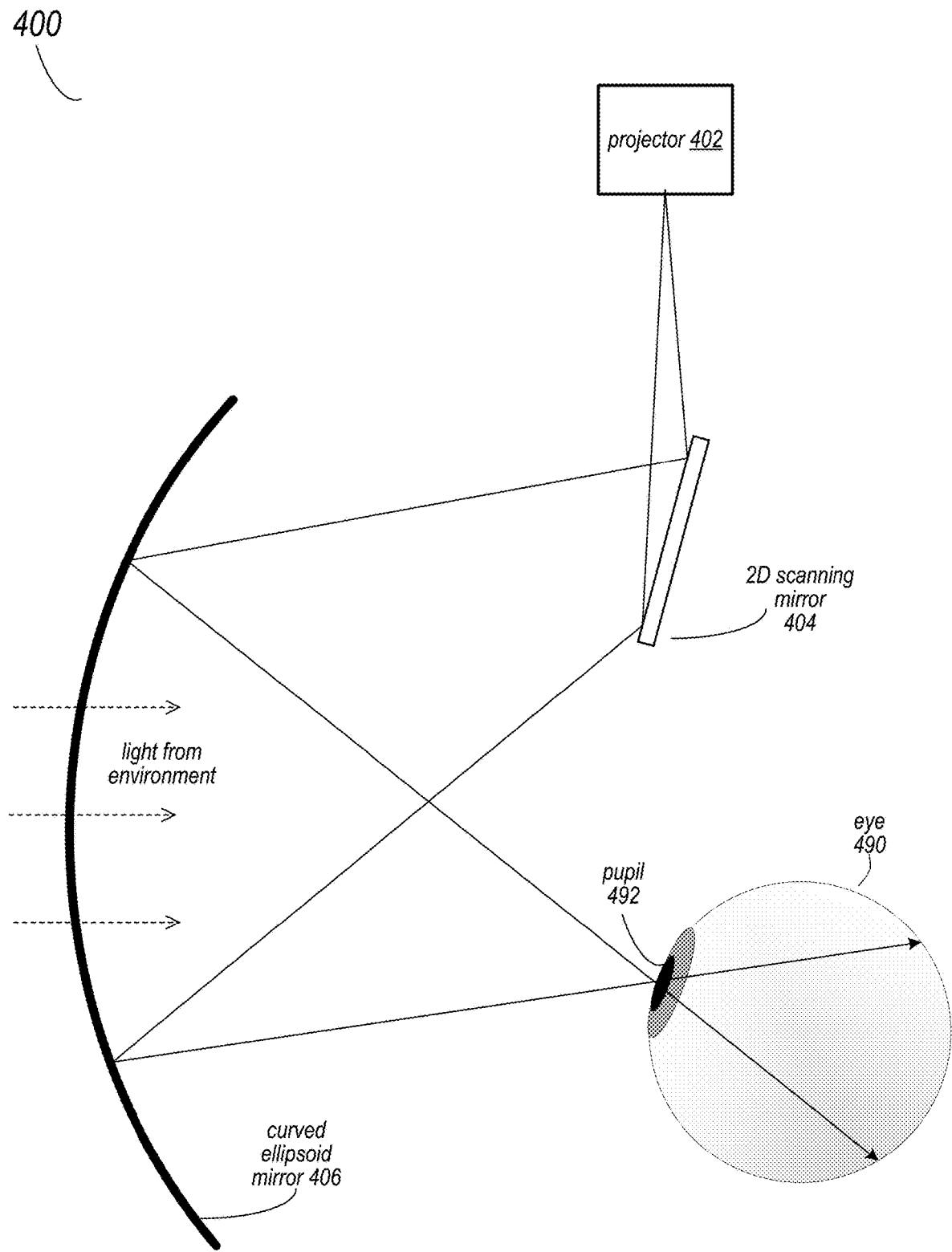
FIG. 4 illustrates a direct retinal projector system that uses a curved ellipsoid mirror to direct light from a projector into a subject's eye, while also transmitting light from the environment to the subject's eye.

A direct retinal projector system may be implemented as a headset (e.g., a helmet, goggles, or glasses) that includes a scanning projector, curved ellipsoid mirror, gaze tracking technology, and a secondary scanning mirror. FIG. 4 illustrates a direct retinal projector system 400 that scans virtual reality (VR) images, pixel, by pixel, to a subject's eye 490. In some embodiments, of a direct retinal projector system 400, under control of a controller (not shown), light beams are scanned by a scanning projector 402 to a secondary scanning mirror 404, and the light beams are then scanned by the scanning mirror 404 to different positions on a curved ellipsoid mirror 406 in front of the subject's eye 490 according to the current position of the subject's eye 490 as determined by gaze tracking technology (not shown), and reflected off the curved mirror 406 through the subject's pupil 492 to form the images on the subject's retina to thus provide a VR view to the subject. Unlike conventional screen-based VR/AR systems, there is no intermediate image on a screen or surface that the subject views. The direct retinal projector system 400 may at least partially eliminate eye lens accommodation from the retinal projection focus to help eliminate the accommodation convergence mismatch. In some embodiments, to provide an AR or MR experience to the user, the curved mirror 406 may allow light from the subject's environment to pass through the mirror to the subject's eye 490 while simultaneously reflecting the light beams generated by the projector 402 to the subject's eye 490, thus enabling the subject to see elements of both an external (real) scene and the virtual reality (VR) images projected by the projector. Note that the direct retinal projector system 400 is shown for only one eye; generally but not necessarily, there will be a second direct retinal projector system 400 for the second eye.

In the direct retinal projector system 400 as illustrated in FIG. 4, the curved ellipsoid mirror 406 bulges outward significantly, and therefore the headset may be cumbersome and odd looking when worn by a user. In addition, the projector 402 may emit relatively small beams (e.g., 1 mm diameter) that may limit resolution, and the system 400 may have a relatively limited field of view. In addition, the system is mechanically complex; for example, the secondary scanning mirror 404 for adjusting for different eye positions adds complexity. Further, the projector 402 and scanning mirror 404 may be relatively large, further adding to the bulk of the headset.

Direct Retinal Projector AR System with Holographic Combiner

Embodiments of a direct retinal projector AR system are described that include an AR headset with reflective holographic combiners to direct light from light engines into the user's eyes, while also transmitting light from the user's environment to thus provide an augmented or mixed view of reality. The holographic combiners may be implemented as holographic films on relatively flat lenses when compared to the curved ellipsoid mirrors 406 of the system 400 as illustrated in FIG. 4, and thus do not bulge as do the mirrors 406 in that system, making the headset less bulky, more comfortable to wear, and more normal looking; the headset may, for example, be implemented as a relatively normal-looking pair of glasses. Further, embodiments of the AR system may not require extra moving parts or mechanically active elements such as scanning mirror 404 to compensate for the eye changing position in the eye box or for changing optical power from the holographic combiner during the scan, which greatly simplifies the system architecture when compared to the direct retinal projector system of FIG. 4. Further, the light engine may include hologram-based foveal projectors that generally project wider diameter beams over a smaller central field of view, and hologram-based peripheral projectors that generally project smaller diameter beams over a wider field of view. Thus, the light engine may be implemented as a relatively small and thin solid-state system, further reducing the mechanical complexity and bulk of the AR headset when compared to a system as illustrated in FIG. 4.

Figure 29A:
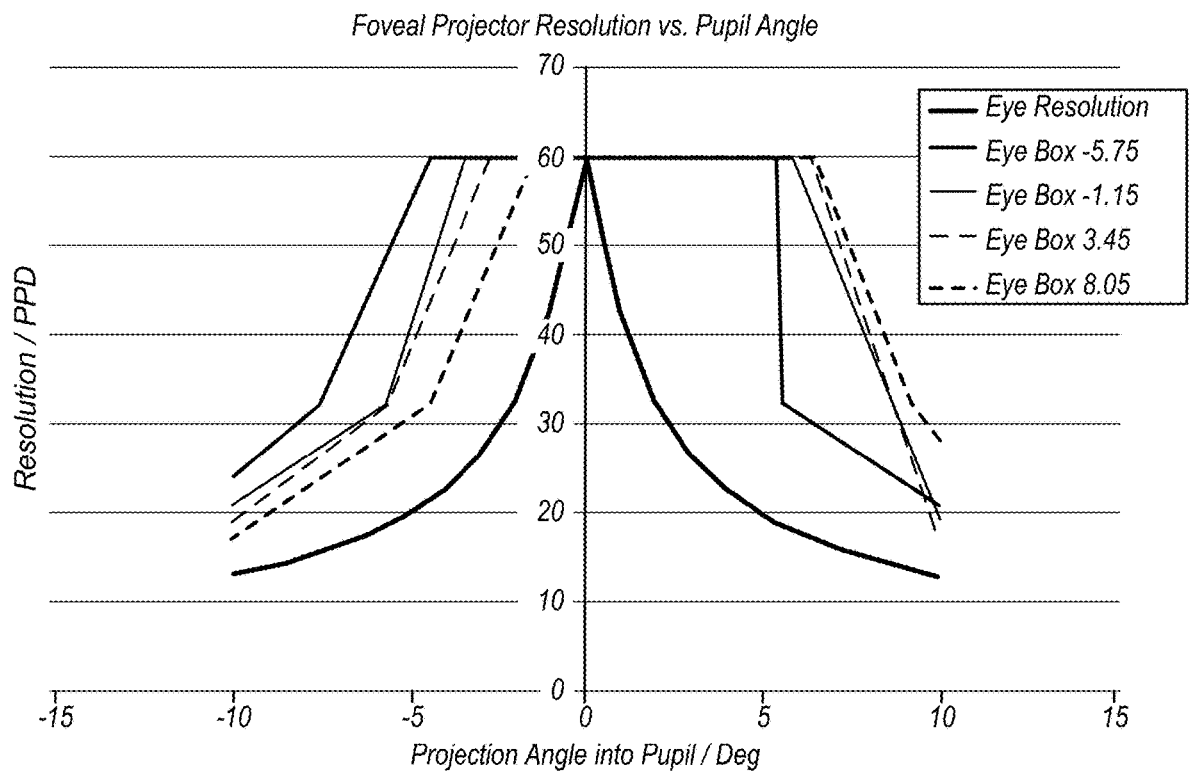
FIG. 29A is a graph of foveal projector resolution vs. pupil angle in an AR system, according to some embodiments.
Figure 29B:
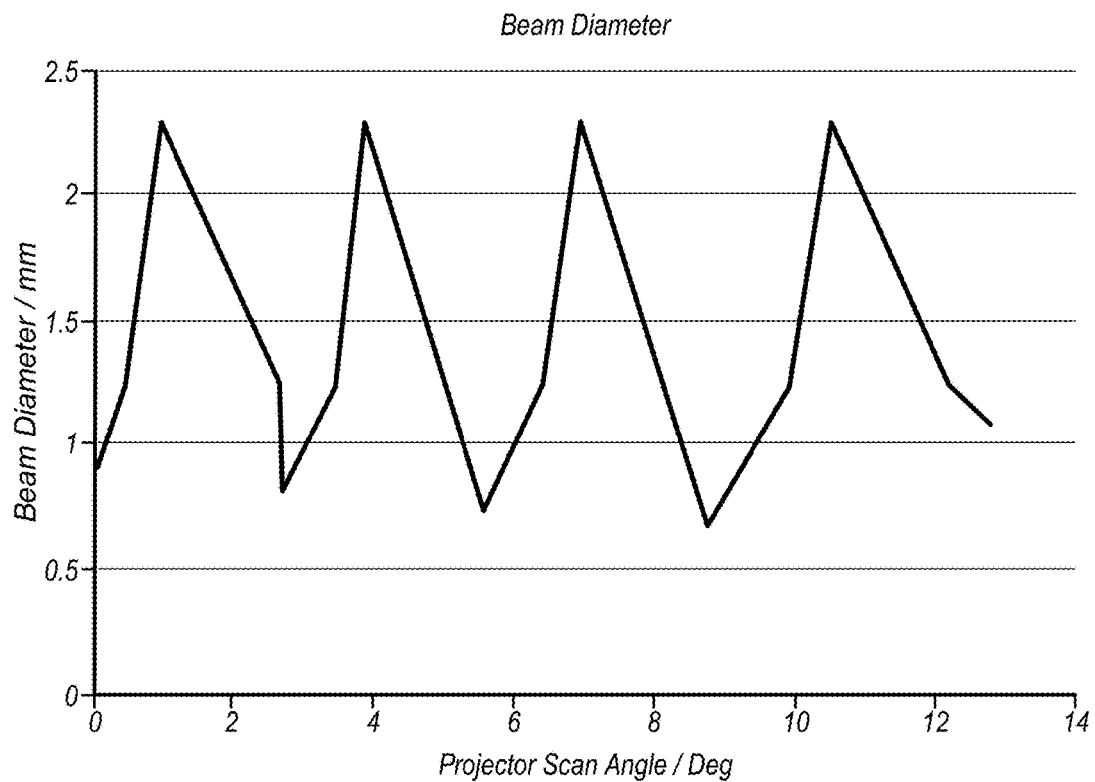
FIG. 29B is a graph of beam diameter for foveal projections in an AR system, according to some embodiments.
Figure 30:
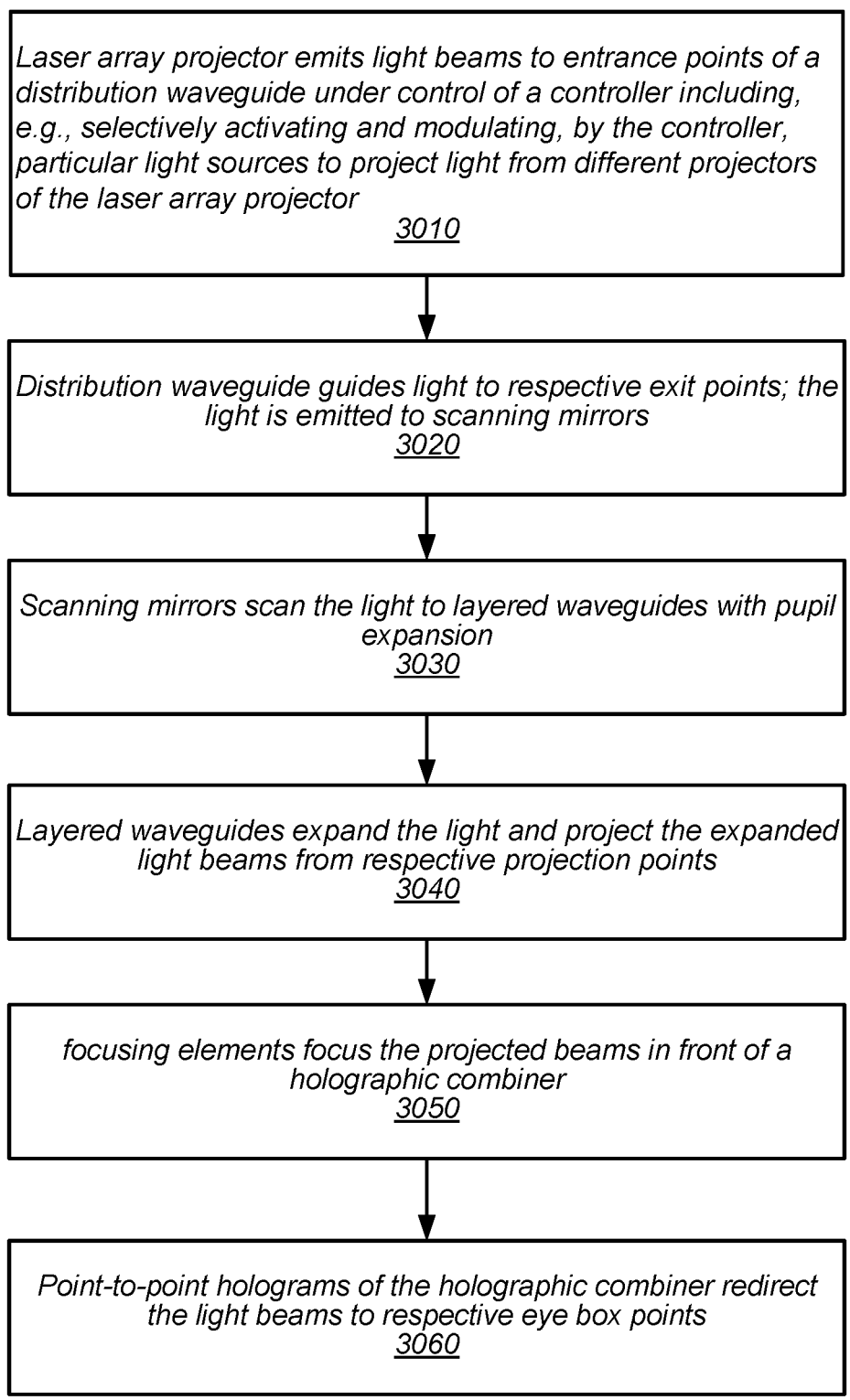
FIG. 30 is a high-level flowchart of a method of operation for an AR system as illustrated in FIGS. 5 through 29B, according to some embodiments.

FIGS. 5 through 30 illustrate architecture, components, and operation of example embodiments of a direct retinal projector AR system. FIG. 30 is a high-level flowchart of a method of operation for an AR system as illustrated in FIGS. 5 through 29B, according to some embodiments. Elements of FIG. 30 are explained in greater detail in FIGS. 5 through 29. As indicated at 3010, a laser array projector emits light beams to entrance points of a distribution waveguide under control of a controller. As indicated at 3020, a distribution waveguide guides the light to respective exit points; the light is emitted to scanning mirrors. In some embodiments, the entrance and exit points may be implemented as holograms using a holographic film. Alternatively, the entrance and exit points may be implemented as surface relief gratings (SRG), which are typically created using lithographic techniques rather than a holographic film. As indicated at 3030, the scanning mirrors scan the light to layered waveguides with pupil expansion. As indicated at 3040, the layered waveguides expand the light and project the expanded light beams from respective projection points. As indicated at 3050, focusing elements focus the projected beams in front of a holographic combiner. As indicated at 3060, point-to-point holograms of the holographic combiner redirect the light beams to respective eye box points. In some embodiments, the subject's pupil position may be tracked, and the AR system may selectively illuminate different eye box points according to the tracking information.

Figure 5:
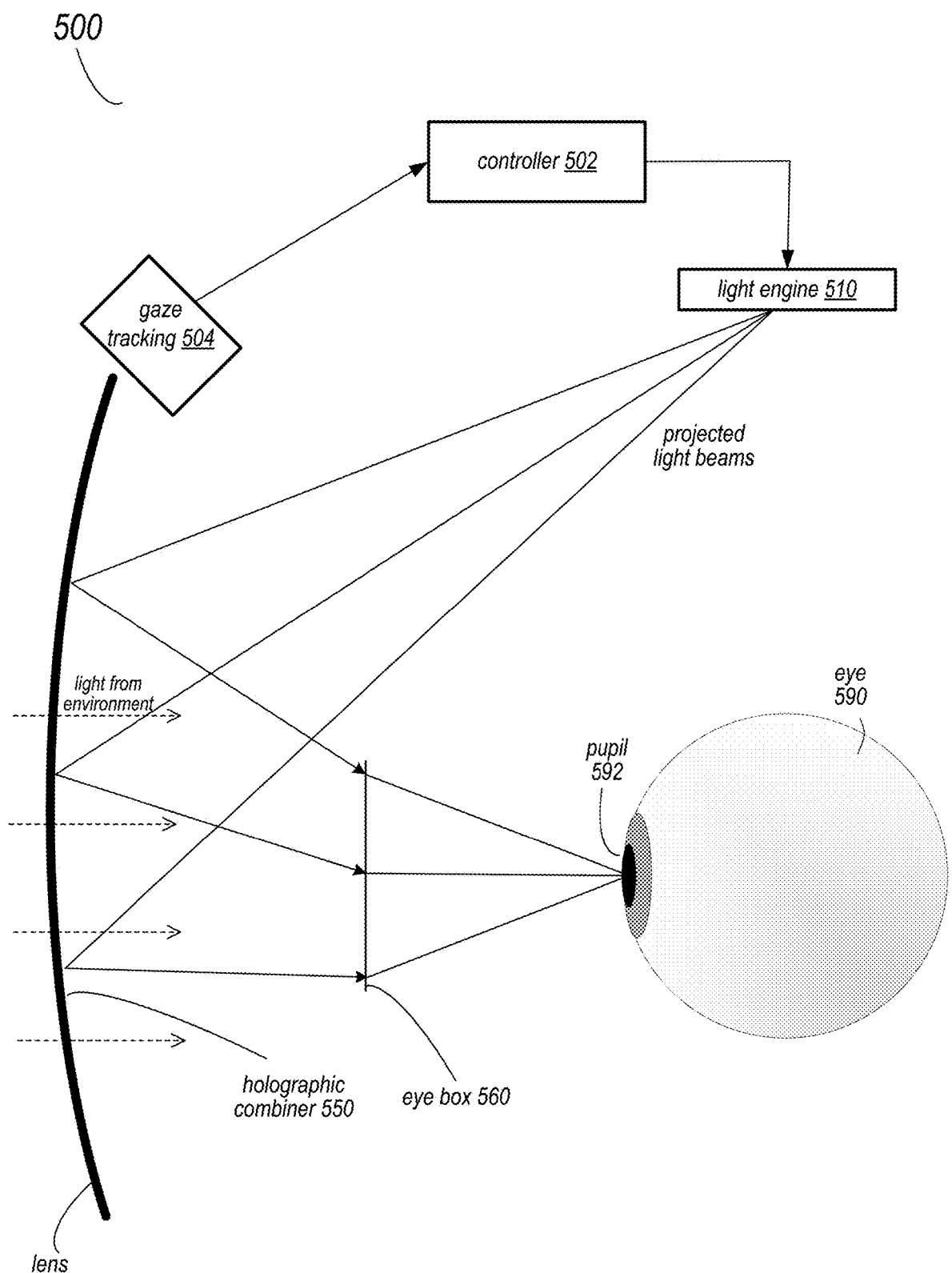
FIG. 5 illustrates an augmented reality (AR) system that uses a reflective holographic combiner to direct light from a light engine into a subject's eye, while also transmitting light from the environment to the subject's eye, according to some embodiments.
Figure 6:
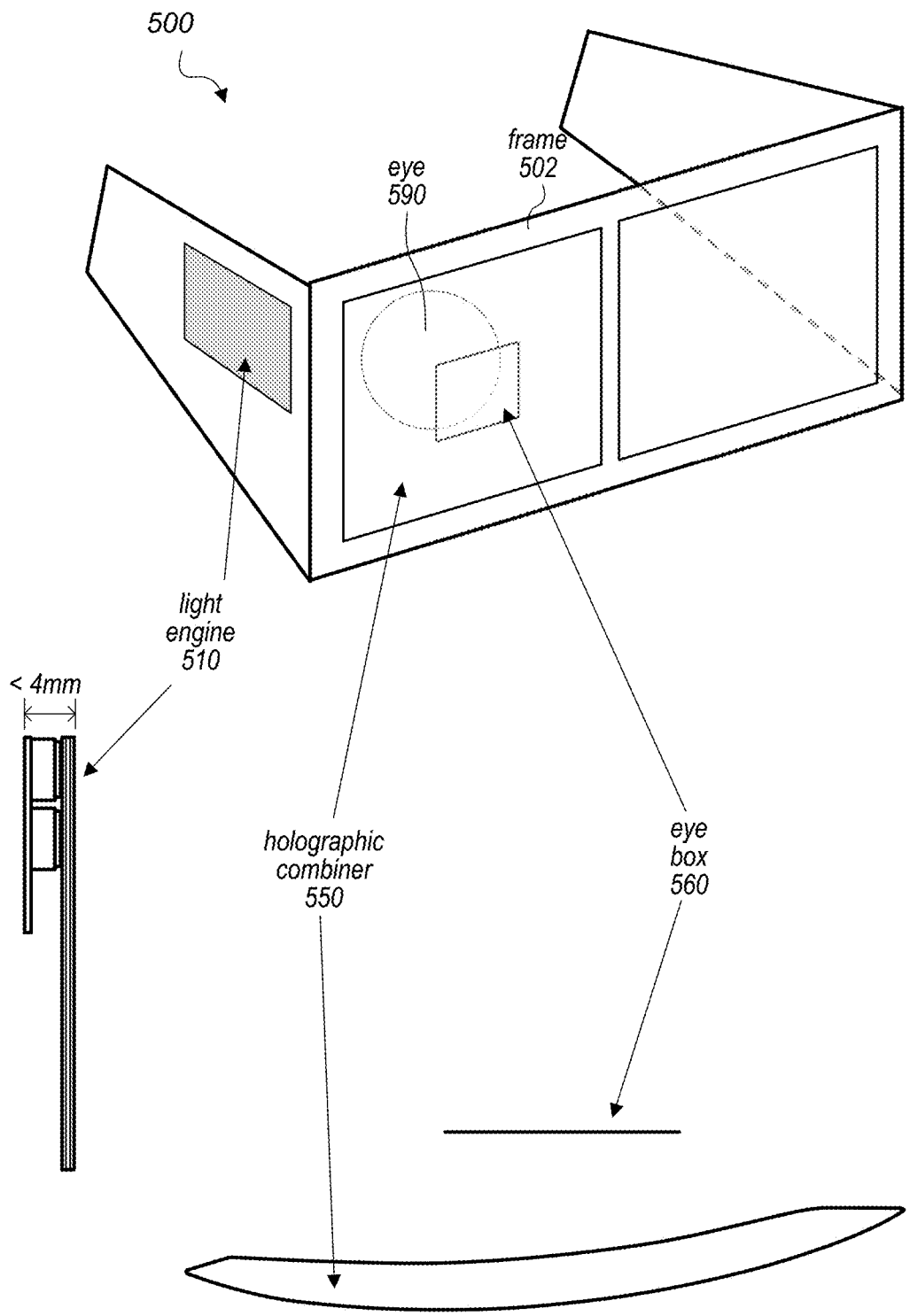
FIG. 6 illustrates an AR headset that includes a reflective holographic combiner to direct light from a light engine into a subject's eye, while also transmitting light from the environment to the subject's eye, according to some embodiments.

FIGS. 5 and 6 illustrate an augmented reality (AR) system 500 that uses a reflective holographic combiner 550 to direct light projected from a light engine 510 into a subject's eye 590, while also transmitting light from the environment to the subject's eye 590, according to some embodiments. In some embodiments, the AR system 500 may include a headset (e.g., a helmet, goggles, or glasses as shown in FIG. 6) that includes a frame (not shown in FIG. 5), a light engine 510, a gaze tracking 504 component, and a lens that includes a holographic combiner 550, for example implemented as a holographic film on either side of, or embedded in, the lens. The lens may be a piece of curved glass or plastic with optical power depending on the user's particular requirements, or alternatively a piece of curved glass or plastic with no optical power. Note that, for simplicity, the system 500 is shown for only one eye; generally but not necessarily, there will be a second system 500 (light engine 510, gaze tracking 504, and lens with holographic combiner 550) for the second eye. However, there may be a single controller 502 in the system 500.

The system 500 may include a controller 502 that controls operation of the light engine(s) 510. The controller 502 may be integrated in the headset, or alternatively may be implemented at least in part by a device (e.g., a personal computer, laptop or notebook computer, smartphone, pad or tablet device, game controller, etc.) external to the headset and coupled to the headset via a wired or wireless (e.g., Bluetooth) connection. The controller 502 may include one or more of various types of processors, CPUs, image signal processors (ISPs), graphics processing units (GPUs), coder/decoders (codecs), memory, and/or other components. The controller 502 may, for example, generate virtual content for projection by the light engines 510 of the headset. The controller 502 may also direct operation of the light engines 510, in some embodiments based at least in part on input from a gaze tracking 504 components of the headset. The gaze tracking 504 component may be implemented according to any of a variety of gaze tracking technologies, and may provide gaze tracking input to the controller 500 so that projection by the light engine 510 can be adjusted according to current position of the subject's eyes 590.

In some embodiments, the holographic combiner 550 may be recorded with a series of point to point holograms; one projection point interacts with multiple holograms to project light onto multiple eye box 560 points. In some embodiments, the holograms are arranged so that neighboring eye box 560 points are illuminated from different projection points. In some embodiments, the holographic combiner 550 and light engine 510 may be arranged to separately project light fields with different fields of view and resolution that optimize performance, system complexity and efficiency, so as to match the visual acuity of the eye. In some embodiments, the light engine 510 may include one or more (e.g., four, in some embodiments) foveal projectors that generally project wider diameter beams over a smaller central field of view, and one or more (e.g., four, in some embodiments) peripheral projectors that generally project smaller diameter beams over a wider field of view.

In some embodiments, the light engine 510 may include multiple independent light sources (e.g., laser diodes, LEDs, etc.) that can independently project from the different projection points (e.g., eight projection points), with a proportion (e.g., four) being foveal projectors and a proportion (e.g., four) being peripheral projectors. In some embodiments, the light engine 510 may include two or more two-axis scanning mirrors to scan the light sources; the light sources may be appropriately modulated (e.g., by controller 502) to generate the desired image. In some embodiments, the light engine 510 includes a series of optical waveguides with holographic or diffractive gratings that move the light from the light sources to generate beams at the appropriate angles and positions to illuminate the scanning mirrors; the light is then directed into additional optical waveguides with holographic film layers recorded with diffraction gratings to expand the projector aperture and to maneuver the light to the projection positions required by the holographic combiner 550.

In some embodiments, the light engine 510 includes a lens for each projector to focus collimated light such that, once reflected off the holographic combiner 550, the light is substantially collimated again when it enters the subject's eye 590. The required focal surface may be complicated by the astigmatism of the holographic combiner 550, but is a curved surface in front of the combiner 550. The ideal focal surface is different for different eye box 560 positions, and errors may lead to less collimated output. However, in some embodiments, this can be compensated by reducing the beam diameter for different angles where the errors between the ideal focal surface and the actual best fit focal surface are greatest, which alleviates the problem by increasing the F-number and hence the depth of focus of the beam. In some embodiments, these features may be incorporated into a holographic lens for each projector.

In some embodiments, active beam focusing elements may be provided for each projection point. This may reduce or eliminate the need to change beam diameter with angle. This may also enable beams that diverge into the eye 590 to, rather than being collimated, match the beam divergence of the supposed depth of the virtual object(s) being projected by the light engine 510.

With the methods and components described above, the AR system 500 may not require extra moving parts or mechanically active elements to compensate for the eye changing position in the eye box or for the changing optical power from the holographic combiner during the scan, which greatly simplifies the system architecture when compared to other direct retinal projector systems. In addition, embodiments of the AR system 500 may provide a wide field of view (FOV) (e.g., ~120 deg×80 deg at the center of the eye box 560), high resolution (e.g., 60 PPD at the fovea of the eye 590). In addition, the holographic combiner 550 implemented similar to a regular glasses lens and the very thin light engine 510 (e.g., <4 mm thick, as shown in FIG. 6) allows the headset to be implemented in a small package size.

Table 1 lists some example values for parameters of an example AR system 500 as illustrated in FIGS. 5 and 6, and is not intended to be limiting.

TABLE 1

| Parameter | Foveal | Peripheral | Notes |
| --- | --- | --- | --- |
| Laser beam diameter at pupil | 2.3 mm max | 0.5 mm max | Beam diameter varies with eye direction |
| Resolution | 60 ppd | 13 ppd | Resolution reduces gradually for eye angles greater than ~3 deg |
| Frame rate | 30 Hz | 110 Hz | Two identical MEMS mirrors with frequency 22 kHz, driven differently |
| FOV at eye (one pupil position) | 10° × 10° | 120° × 74° | At the center of the eye box (peripheral FOV reduces towards the extremes) |
| Range of pupil positions | +/−15° any direction | | Eye box size 18.4 mm × 11.5 mm, hence no mechanism needed for inter-pupillary distance |
| Depth of focus for user (beam focus adjusted to object distance | 3.5 m to infinity | | |

Referring to FIGS. 5 and 6, the following provides further non-limiting details about and descriptions of the components of the AR system 500.

The holographic combiner 550 may reduce or eliminate the bulge of the ellipsoid mirror of a system 400 as illustrated in FIG. 4. While holographic combiners are used, as an alternative optical waveguide combiners could be used. However, a reflective holographic combiner has a better FOV than a waveguide combiner, which would be limited by total internal reflection angles. Field of view (FOV) of the holographic combiner 550 may, for example, be 120 degrees. A curved lens with a holographic film that implements the holographs may be used as the holographic combiner 550.

By using optical waveguides, the light engine 510 may be very thin for example ~3.8 mm.

Resolution of the foveal projector (+/−10 deg), 60 PPD around center. The beam diameter reduces from 3-10 deg. ~20 PPD at 10 deg.

Resolution of the peripheral projector (approximately +60-30 deg), 13 PPD at 10 deg, dropping to a minimum of 2.3 PPD at 50 deg.

Holographic combiner
  Eye box: 18.4×11.5 mm.
  Point-to-point holographic combiner.
  8 projection points (4 foveal, 4 peripheral).

40 foveal points in the eye box.
84 peripheral points in the eye box.
Hence, a total of 372 holograms (RGB).
Laser Projectors
  20 laser diodes of each color (RGB)—total 60.
  16 foveal projectors (laser diodes)—four for each projection point.
  4 peripheral projectors (laser diodes)—one for each projection point.
  Packaged in a 1D array of edge emitter laser diodes. However, VCSELs or other light-emitting technologies may be used in some embodiments.
Gaze tracking—In some embodiments, to reduce complexity, gaze tracking may not be included in the system 500. However, some embodiments may include a gaze tracking 504 component.

The architecture, components, and operation of an example AR system 500 as broadly illustrated in and described for FIGS. 5 and 6 are discussed below in greater detail in reference to FIGS. 6 through 30.

Figure 7:
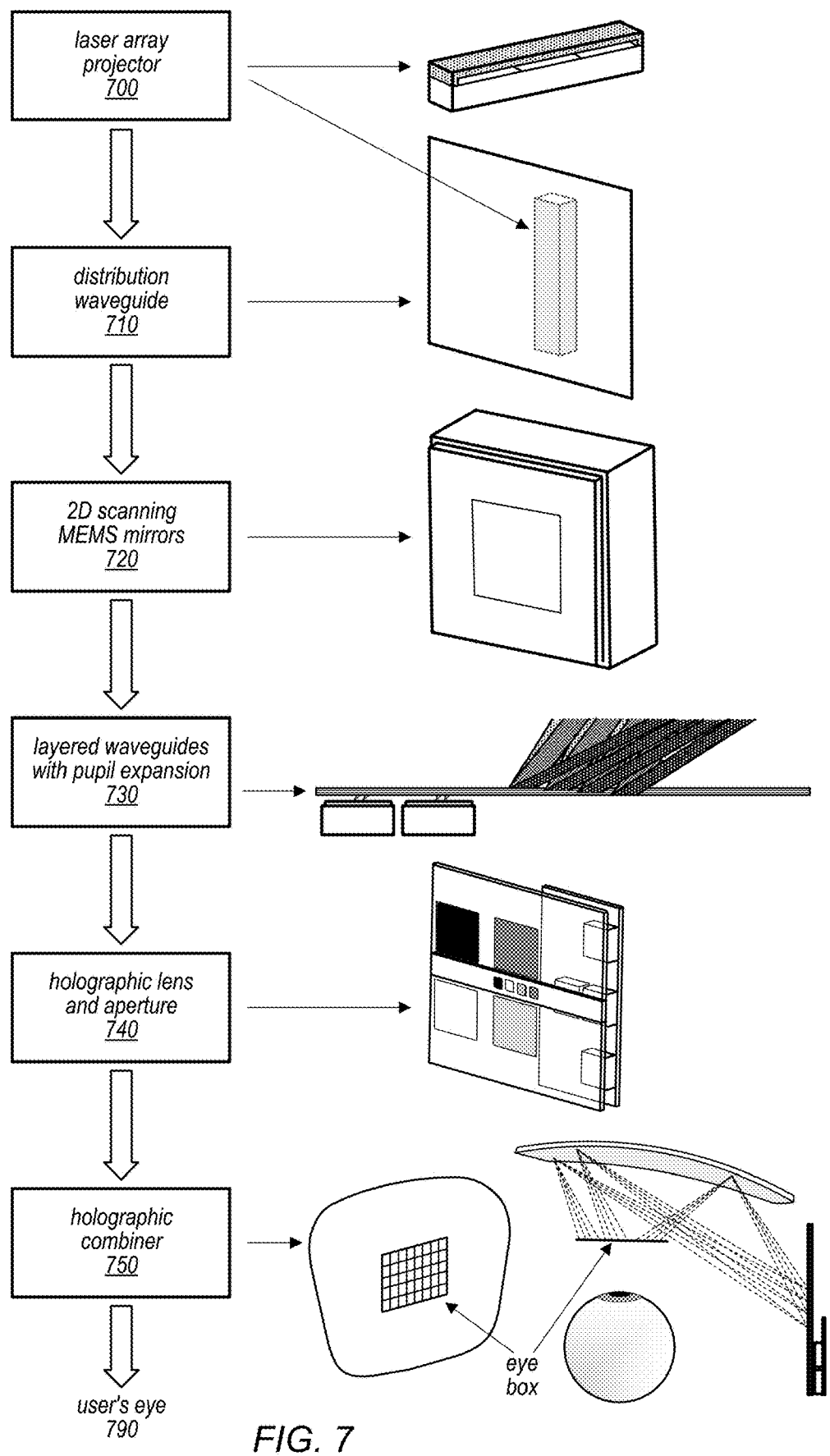
FIG. 7 illustrates high-level components of an AR system, according to some embodiments.

FIG. 7 illustrates high-level components of an AR system 500, according to some embodiments. FIG. 7 also graphically illustrates the path of light through the components of an AR system 500, according to some embodiments. As shown in FIG. 7, light emitted by a laser array projector 700 is guided to 2D scanning microelectromechanical systems (MEMS) mirrors 720 by a distribution optical waveguide 710. The light enters the distribution waveguide 710 at entrance points and exits the waveguide 710 at exit points. In some embodiments, the entrance and exit points may be implemented as holograms using a holographic film. Alternatively, the entrance and exit points may be implemented as surface relief gratings (SRG), which are typically created using lithographic techniques rather than a holographic film. The mirrors 720 scan the light to layered waveguides 730 that perform pupil expansion; the light is then projected from the layered waveguides 730 by foveal and peripheral holographic projectors. In some embodiments, a holographic lens and aperture (one for each projector) focuses the emitted light beams at a focus curve in front of the holographic combiner 750; the holograms of the reflective holographic combiner 750 direct the light beams to respective foveal and peripheral positions on the eye box to thus scan the light beams to the user's eye 790.

Figure 8:
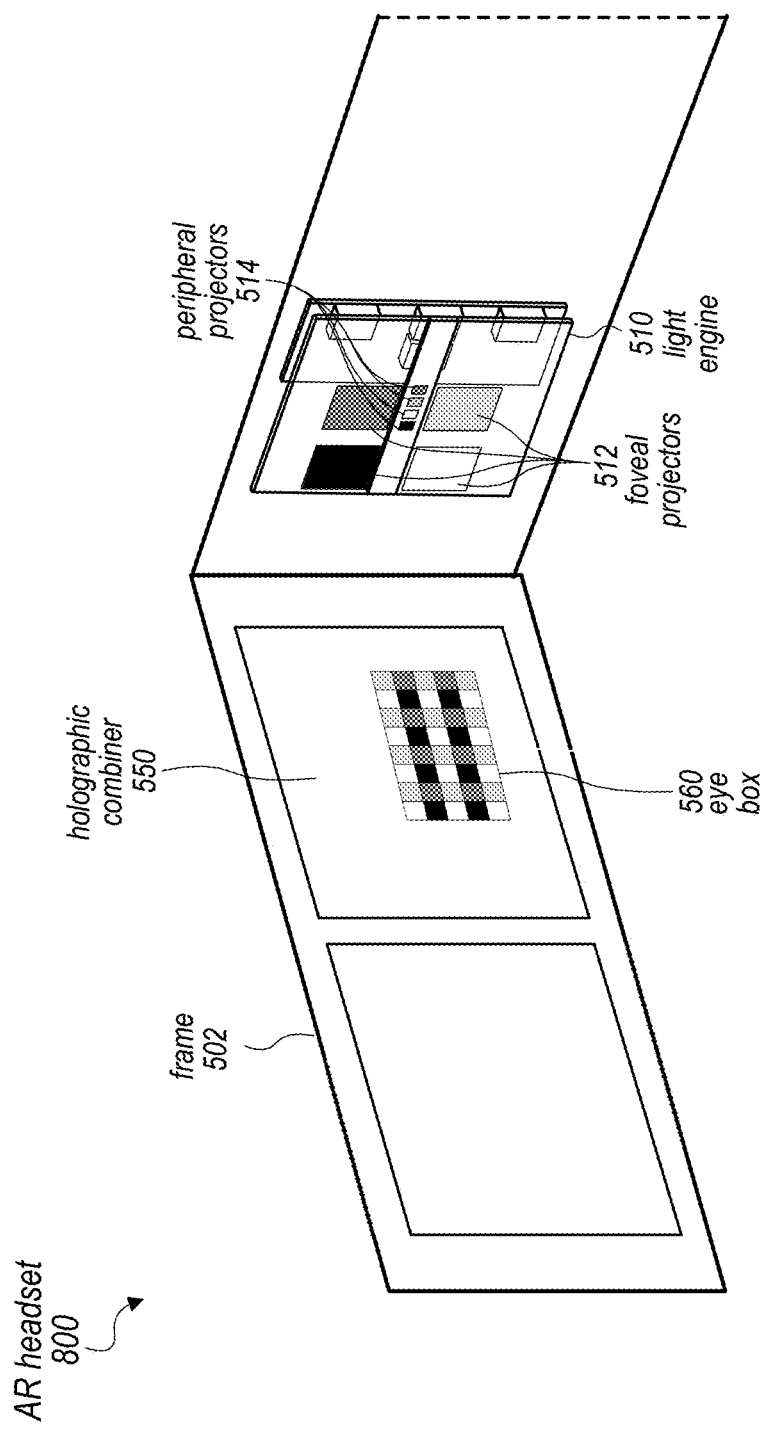
FIG. 8 illustrates foveal and peripheral projectors of a light engine in an AR headset, according to some embodiments.
Figure 9:
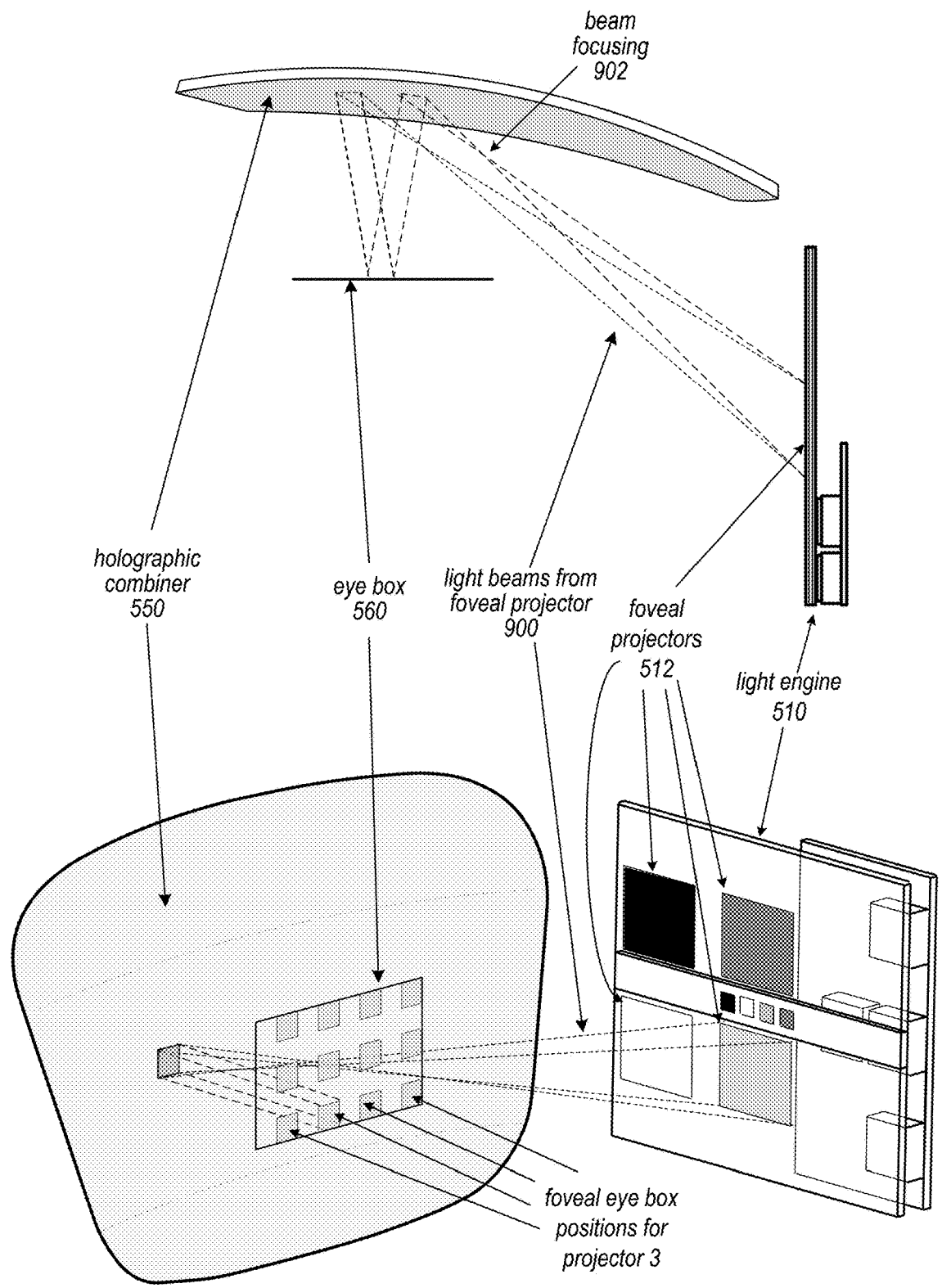
FIG. 9 illustrates light beams from foveal projectors in an AR system, according to some embodiments.
Figure 10:
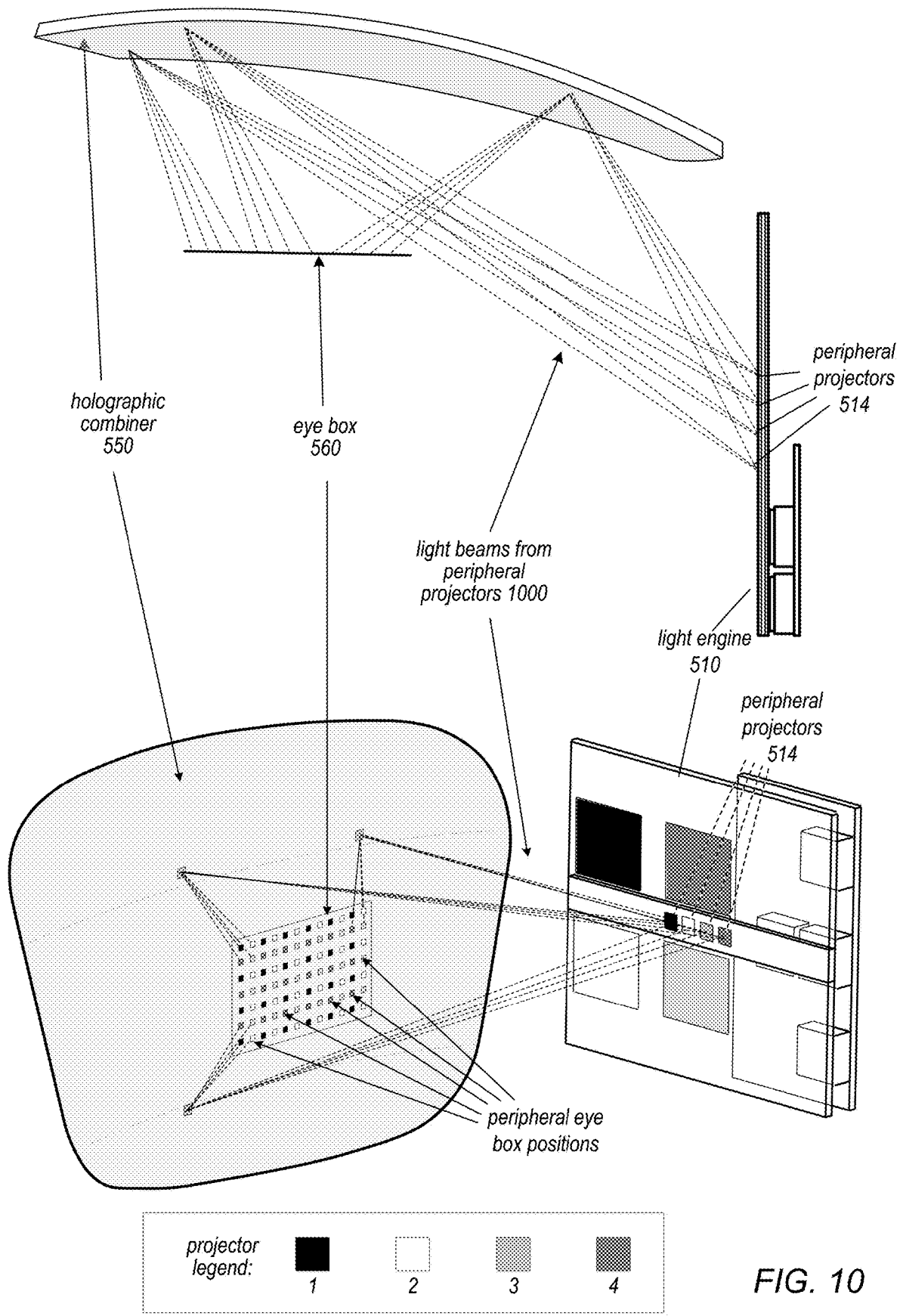
FIG. 10 illustrates light beams from peripheral projectors in an AR system, according to some embodiments.

FIG. 8 illustrates foveal and peripheral projectors of an example light engine in an example AR headset 800, according to some embodiments. In some embodiments, an AR headset 800 may include a frame 502 (e.g., an eyeglasses frame), a light engine 510, and a holographic combiner 550. FIG. 8 shows a light engine 510 and a reflective holographic combiner 550 for only the right eye; however, generally there will also be a light engine 510 and a holographic combiner 550 for the left eye. In some embodiments, AR headset 800 may include other components, such as a gaze tracking component and a controller. In some embodiments of a light engine 510, there may be four foveal projectors 512 and four peripheral projectors 514 that each scans beams to the holographic combiner 550; the holographic combiner 500 directs the beams from the projectors 512 and 514 to respective foveal positions (the larger squares) and peripheral positions (the smaller squares) of the eye box 560. FIGS. 9 and 10 describe foveal 512 and peripheral 514 projectors in more detail.

FIG. 9 illustrates light beams from foveal projectors in an example AR system, according to some embodiments. In some embodiments, there may be four foveal projectors 512. For simplicity, FIG. 9 shows views of one of the four foveal projectors 512 scanning to one eye box 560 foveal position. Note, however, that each foveal projector 512 may simultaneously scan to two or more, or all, of its respective eye box 560 positions, and that all of the foveal projectors 512 may simultaneously scan to their respective eye box 560 positions. However, the actual image that is projected to the eye box 560 may depend on the position of the subject's eye as determined by a gaze tracking component of the system 500 (not shown in FIG. 9). In the example shown in FIG. 9, foveal projectors 2 and 3 each scan to 12 respective eye box 560 positions, while foveal projectors 1 and 4 each scan to 8 respective eye box 560 positions.

In some embodiments, each foveal projector 512 may project light beams 900 that are 4 mm or greater in diameter. In some embodiments, foveal light beams of 7 mm or greater diameter may be used to generate approximately 2.3 mm beams entering the subject's pupil. Note that 2.3 mm roughly corresponds to the diameter of the pupil at high resolution under normal/bright lighting conditions; thus, the foveal light beams 900 may substantially fill the subject's pupil to achieve maximum resolution. A large diameter (4 mm or greater, for example 7 mm in some embodiments) for the foveal light beams 900 may thus be used to maximize resolution at the fovea. The holographic combiner 550 has optical power, and the large diameter of the light beams 900 from the foveal projectors 512 may be necessary due to the angle between the light engine 510 and the combiner 550 and the optical power of the combiner 550 to generate ~2.3 mm, substantially collimated beams directed to the eye box 560 by the combiner 550. Note, however, that in some embodiments foveal light beams within the range of 4 mm-7 mm may be used to achieve adequate, but not optimal, resolution. As shown in FIG. 9, the foveal beams 900 may be rectangular or square. Using rectangular or square beams 900 from the foveal projectors 512 may help to form a tessellated pattern at the eye box 560. However, other beam shapes (e.g., circular) may be used in some embodiments.

In some embodiments, each foveal projector 512 may be illuminated by 12 laser diodes of the light engine 510; the 12 laser diodes include 4 laser diodes of each color/wavelength (red, green, and blue (RGB)). Using 4 laser diodes for each color to illuminate a foveal projector 512 may reduce the required scan angle of the scanning MEMS mirrors, and hence reduce the mirror speed required when scanning pixels. Higher mirror speeds may tend to smear pixels, which reduces resolution.

In some embodiments, the light engine 510 includes a holographic lens and aperture (one for each foveal projector 512) that focuses the emitted light beams 900 at a focus curve 902 in front of the holographic combiner 550; the holograms of the reflective holographic combiner 550 direct the light beams to respective foveal positions on the eye box 560 to thus scan the light beams to the user's eye.

FIG. 10 illustrates light beams from peripheral projectors in an example AR system, according to some embodiments. In some embodiments, there may be four peripheral projectors 514. FIG. 10 shows views of each of the four peripheral projectors 514 scanning to three eye box 560 peripheral positions (the smaller squares). Note that each peripheral projector 514 may simultaneously scan to two or more, or all, of its respective eye box 560 positions, and that all of the peripheral projectors 514 may simultaneously scan to their respective eye box 560 positions. However, the actual image that is projected to the eye box 560 may depend on the position of the subject's eye as determined by a gaze tracking component of the system 500 (not shown in FIG. 10). In the example shown in FIG. 10, peripheral projectors 1 and 2 each scan to 24 respective eye box 560 positions, while peripheral projectors 3 and 4 each scan to 18 respective eye box 560 positions. Note that the peripheral eye box positions lie within or overlap the foveal eye box positions/squares in the eyebox 560.

In some embodiments, the projection area on the combiner 550 is fixed. Hence, the projected field of view (FOV) does change depending on the eye position in the eye box 560. In some embodiments, at near the center of the eye box 560, FOV for the right eye may be:

Azimuth: +60 deg (temporal) to −30 deg (nasal)
Elevation: +35 deg (top) to −38 deg (bottom)

Figure 11:
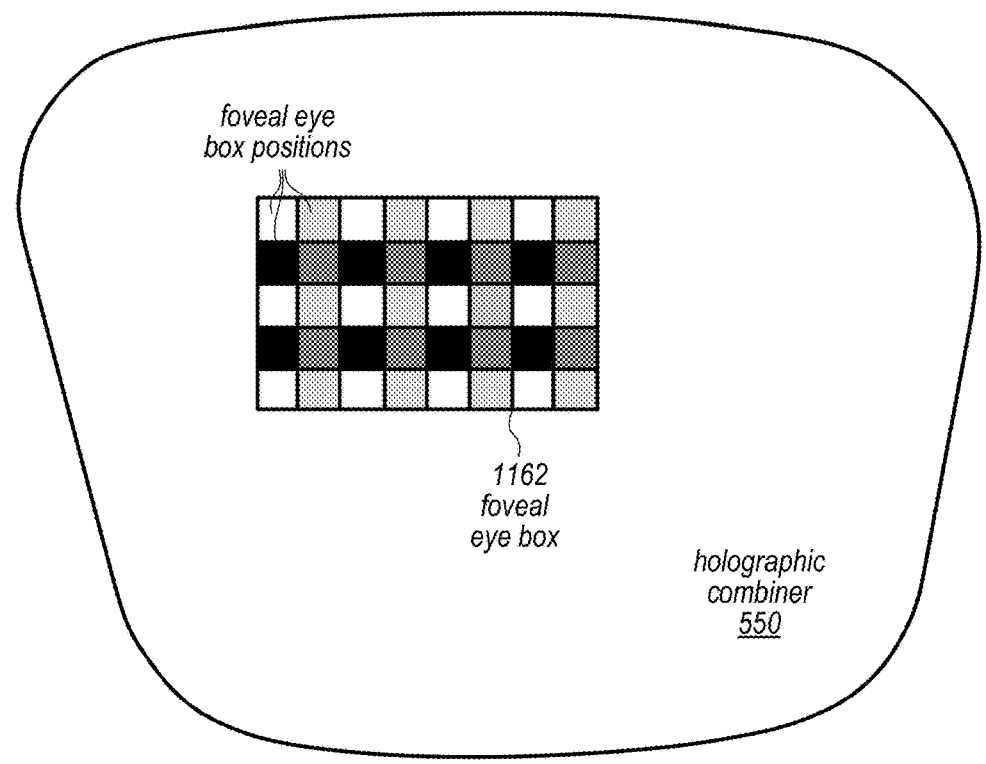
FIG. 11 illustrates foveal and peripheral eye boxes for an AR system, according to some embodiments.
Figure 11:
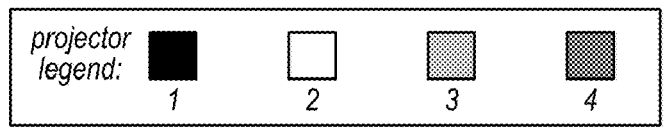
Figure 11:
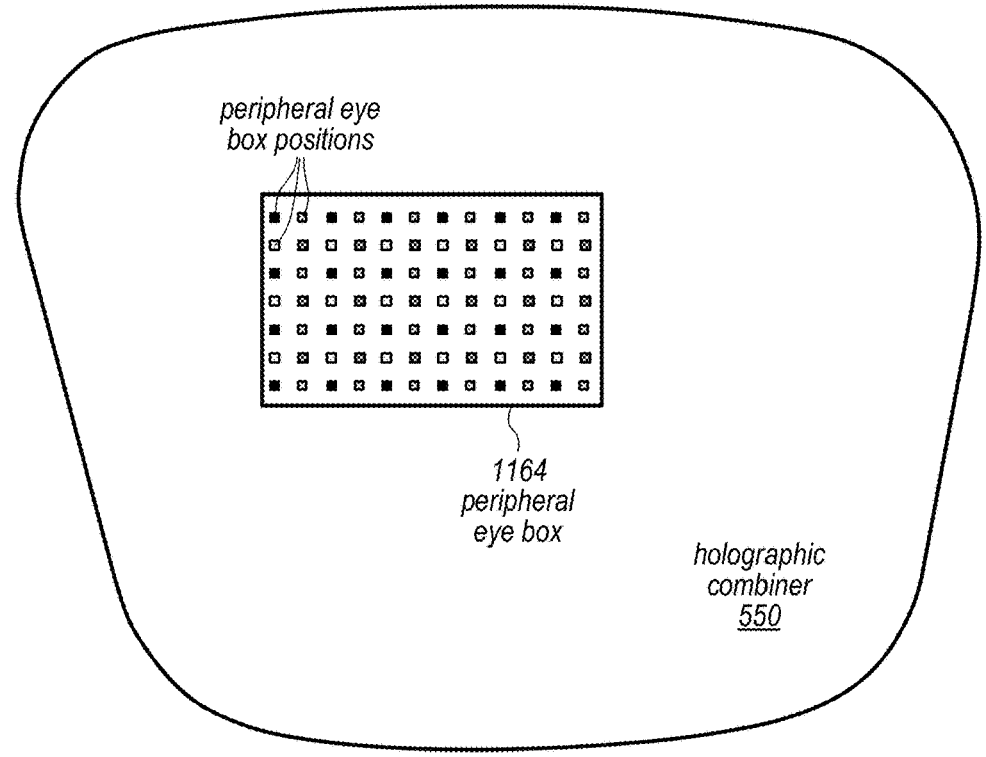

FIG. 11 illustrates foveal 1162 and peripheral 1164 eye boxes for an example AR system, according to some embodiments. In some embodiments, for the foveal eye box 1162, beam width may be 2.3 mm. Given a beam width of 2.3 mm, if the eye's pupil diameter>4.6 mm, then in a worst case scenario there could be a conflict of information from neighboring foveal eye box points or positions corresponding to a given foveal projector. In some embodiments, for the peripheral eye box 1164, beam width may be 0.6 mm, with a 1.6 mm pitch between peripheral positions. Given a beam width of 0.6 mm and pitch of 1.6 mm, if the eye's pupil diameter>4.0 mm, then in a worst case scenario there could be a conflict of information from neighboring peripheral eye box points or positions corresponding to a given peripheral projector. However, note that pupil diameter is typically <4 mm under normal to bright lighting conditions.

Figure 12A:
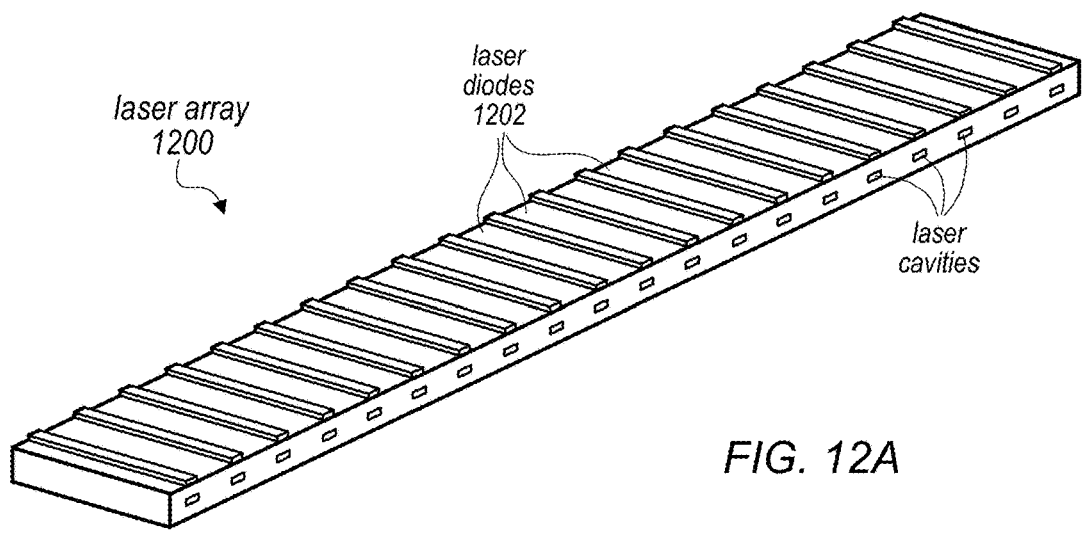
FIGS. 12A through 12C illustrate a laser array for an AR system, according to some embodiments.
Figure 12B:
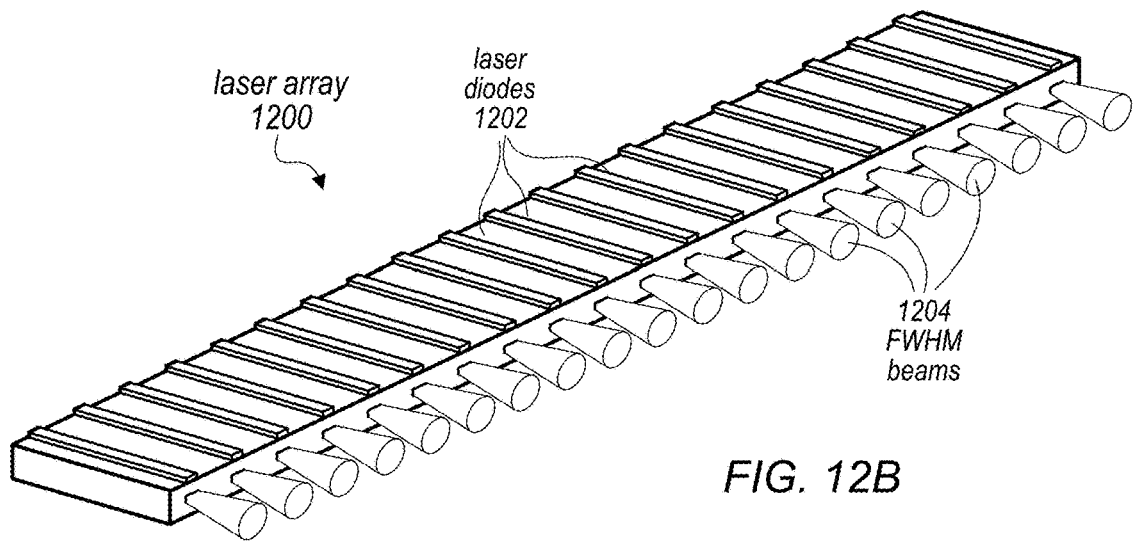
Figure 12C:
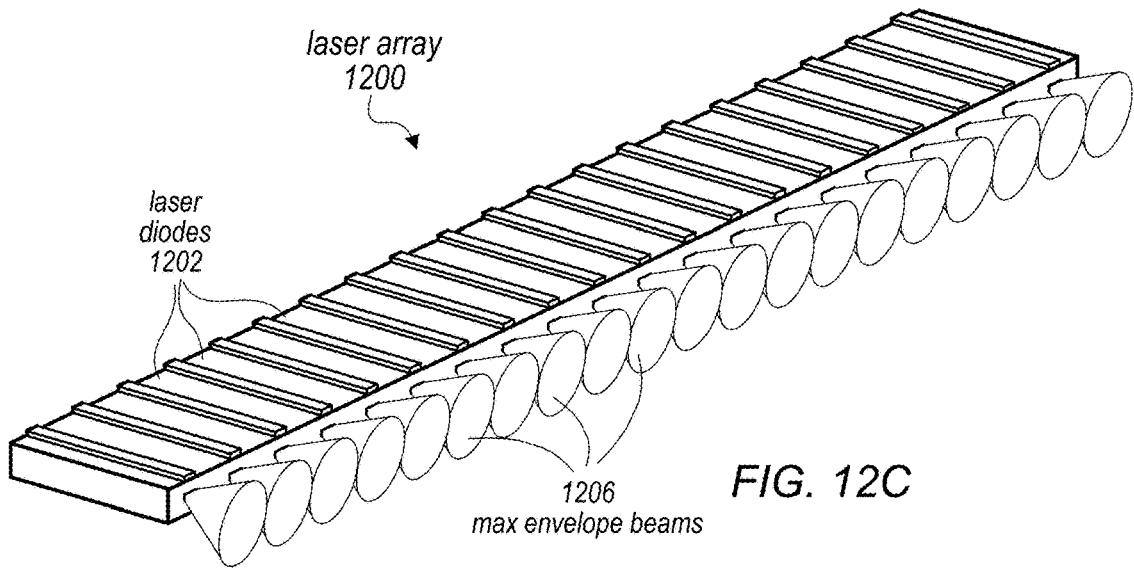

FIGS. 12A through 12C illustrate a laser array that may be used in a light engine of an example AR system, according to some embodiments. FIG. 12A shows a 1D array 1200 of laser diodes 1202, e.g. edge emitting lasers. In some embodiments, the laser diodes 1202 may be very lower power diodes. FIG. 12B shows the laser diodes 1202 in array 1200 emitting full width at half maximum (FWHM) beams 1204. FIG. 12C shows the laser diodes 1202 in array 1200 emitting max envelope beams 1206. The laser diodes 1202 in an array 1200 may all emit light in the same bandwidth/color, e.g. red, green, or blue light. In some embodiments, there may be 20 laser diodes 1202 in a given array 1202, with one laser diode 1202 for each peripheral projector of the light engine, and four laser diodes 1202 for each foveal projector of the light engine. However, more or fewer diodes 1202 may be used in some embodiments. For example, in some embodiments, two laser diodes may be used for each foveal projector, and therefore there may be only 12 laser diodes 1202 in an array 1200.

In some embodiments, the laser cavities may be rectangular, and thus the beams emitted by the laser diodes 1202 may not be circular. In some embodiments, the beams emitted by the laser diodes 1202 in an array may be collimated in two stages.

Figure 13A:
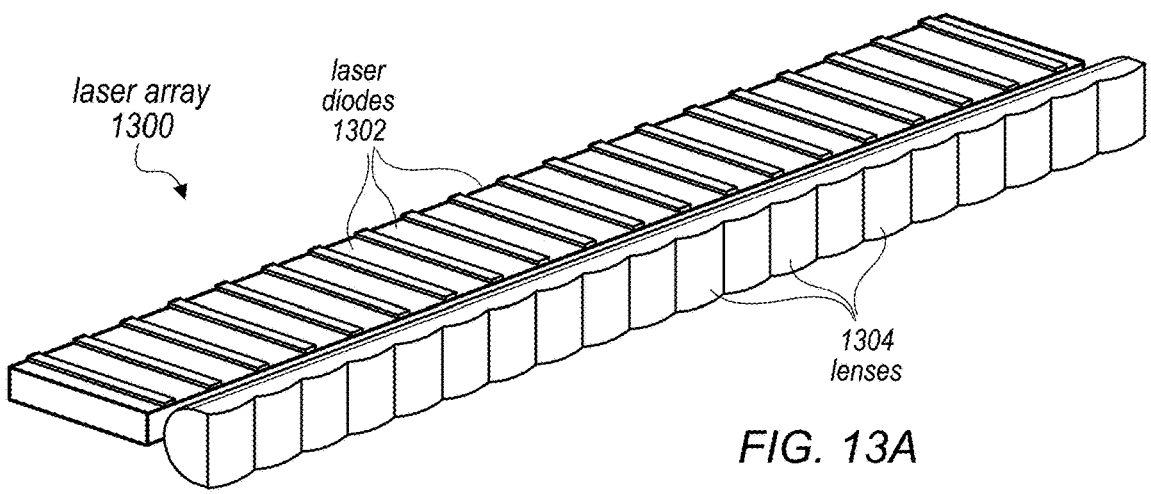
FIGS. 13A through 13C illustrate collimating lenses for a laser array in an AR system, according to some embodiments.
Figure 13B:
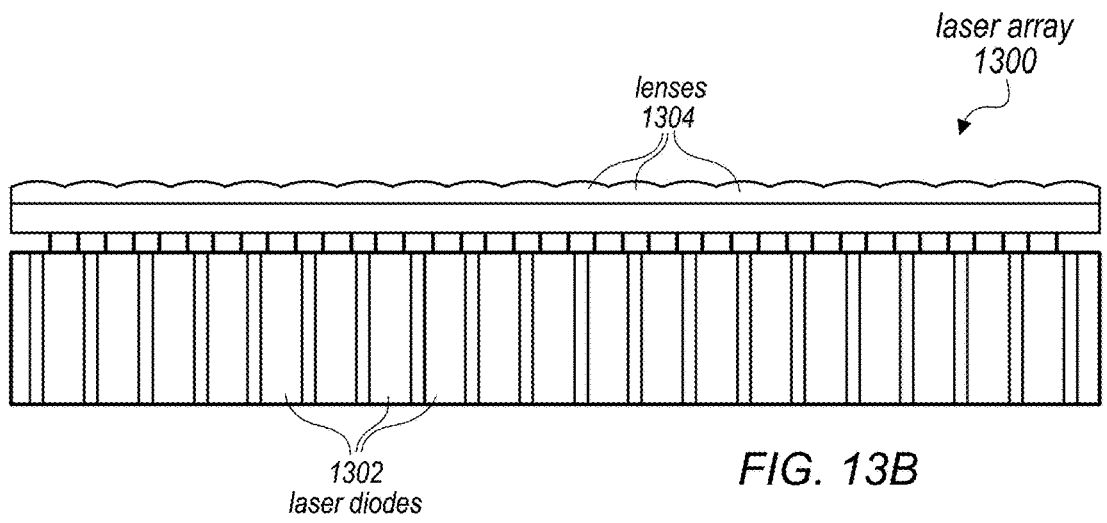
Figure 13C:
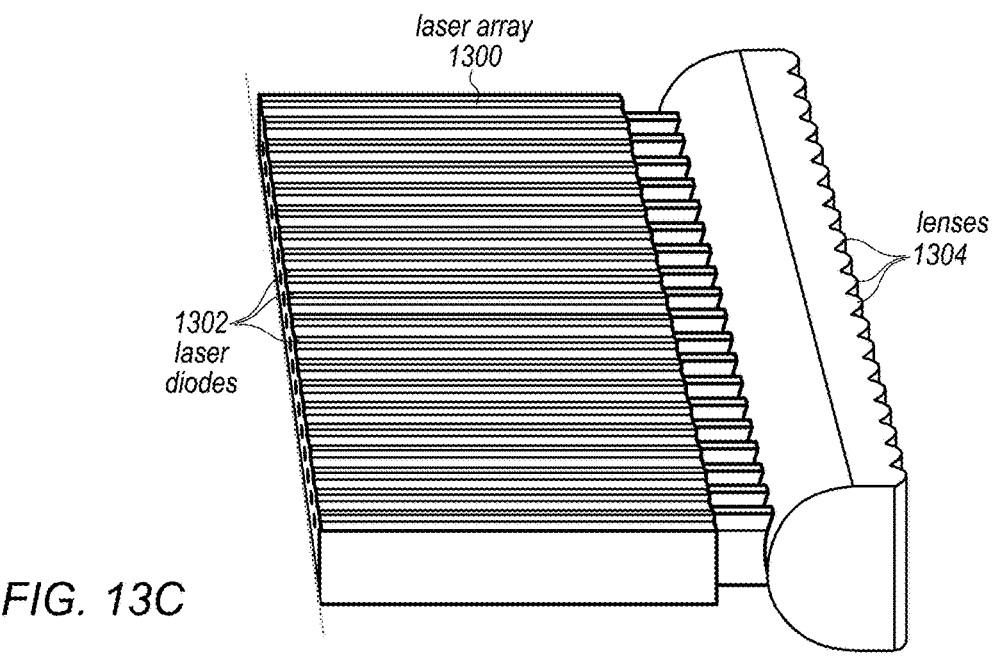

FIGS. 13A through 13C illustrate collimating lenses for a laser array in an AR system, according to some embodiments. In some embodiments, substantially cylindrical collimating lenses 1304, for example formed of molded plastic or glass material, may be used with a laser array 1300; the collimating lenses 1304 may act to collimate light emitted by the diodes 1302 so that the light forms a collimated beam. In some embodiments, holographic elements may be used to collimate the light emitted by diodes 1302 instead of the molded lenses 1304 shown in FIGS. 13A through 13C.

Figure 14:
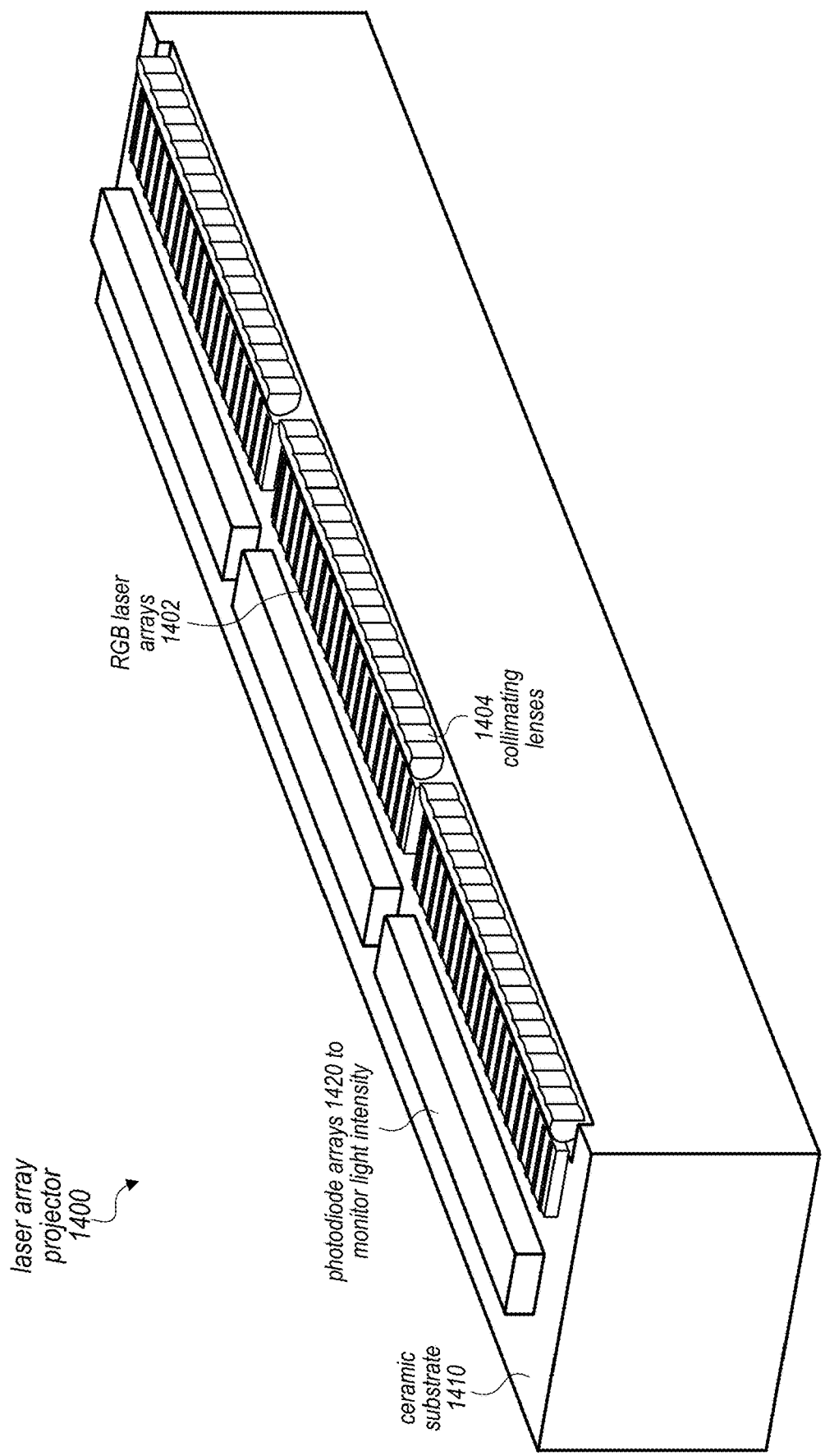
FIG. 14 illustrates a laser array projector, according to some embodiments.

FIG. 14 illustrates a laser array projector 1400 for a light engine in an AR system, according to some embodiments. In some embodiments, a laser array projector 1400 may include laser arrays 1402 and photodiode arrays 1420 on a ceramic substrate 1410. In some embodiments, the laser array projector 1400 may include three laser arrays 1402, for example laser arrays as illustrated in FIGS. 12A through 12C, with one laser array for each color (red, green, and blue (RGB)). In some embodiments, the laser array projector 1400 may include collimating lenses 1404 for each laser array 1402 as illustrated in FIGS. 13A through 13C. In some embodiments, the laser array projector may include photodiode arrays 1420 for each laser array 1402 that monitor light intensity of respective laser diodes in the laser arrays 1402. Light intensity varies with temperature, and so the photodiodes may be used in a feedback loop to maintain a threshold level of intensity for light output by the laser diodes in the arrays 1402.

In some embodiments, assuming a light engine with four peripheral and four foveal projectors as shown in FIG. 8, each laser array 1402 includes twenty laser diodes that all emit the same color of light (red, green, or blue). In each laser array 1402, there is one laser diode of the respective color for each of the four peripheral projectors, and four laser diodes of the respective color for each of the four foveal projectors. Thus, there are three laser arrays 1402 in a laser array projector 1410, with one including red-emitting lasers, one including green-emitting lasers, and one including blue-emitting lasers. There are 60 laser diodes total in the laser array projector, with twelve (four of each color) laser diodes for each of the four foveal projectors (48 total), and three (one of each color) laser diodes for each of the four peripheral projectors (12 total).

While not shown in FIG. 14, a controller of the AV system may selectively activate and modulate the laser diodes in the laser array projector 1410 to generate light for each color of each RGB pixel that is being scanned by the system to the subject's respective eye.

Figure 15:
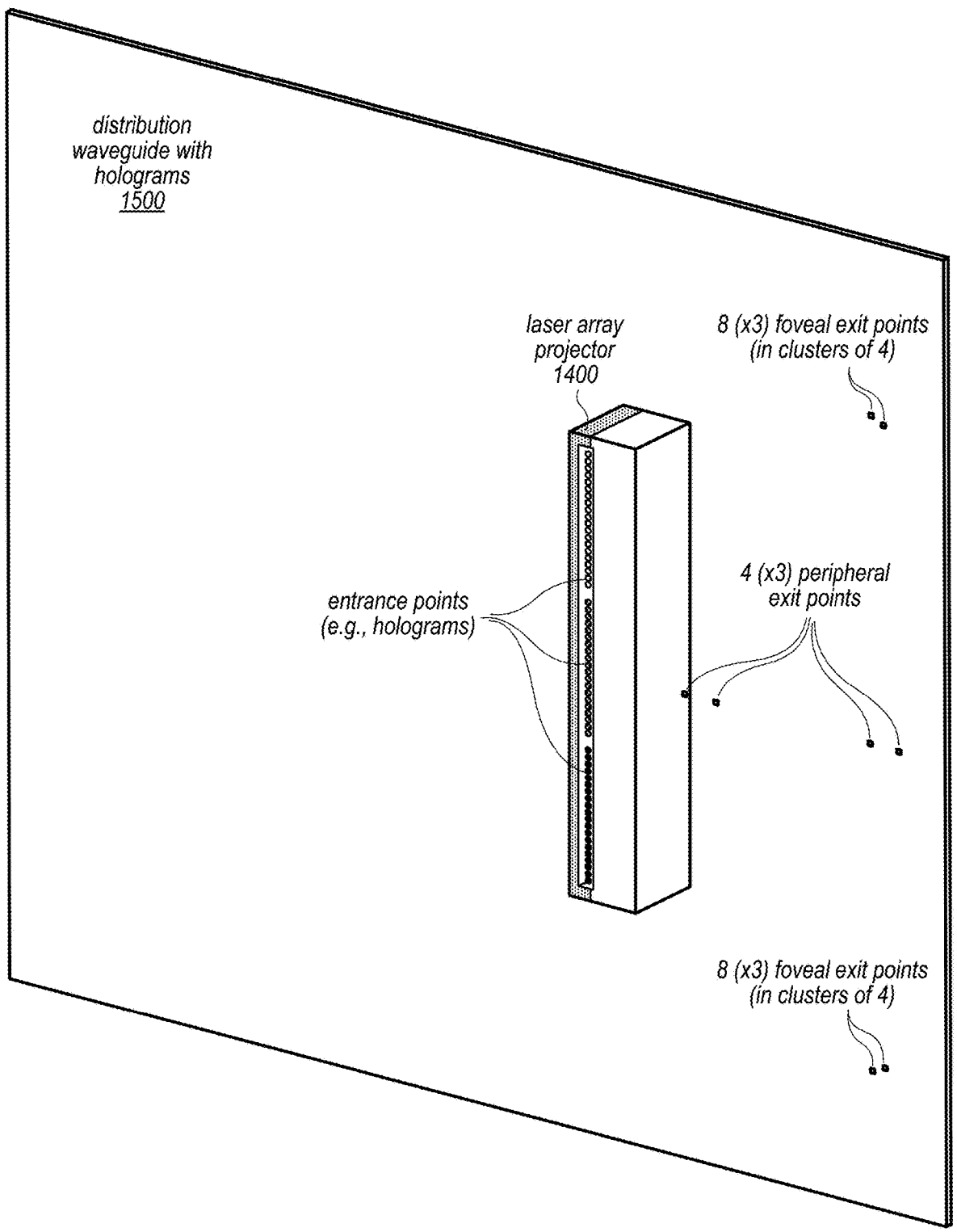
FIG. 15 illustrates a laser array projector and waveguide with holograms, according to some embodiments.

FIG. 15 illustrates a laser array projector and distribution optical waveguide with holograms that may be used in an example light engine, according to some embodiments. As shown in FIG. 15, a laser array projector 1400 as illustrated in FIG. 14 may be attached or mounted to a distribution waveguide 1500. The distribution waveguide 1500 may be planar optical waveguide, or alternatively may be an etched optical waveguide. Assuming 60 laser diodes (20 of each color) in projector 1400, there are 60 entrance points and 60 exit points on waveguide 1500. Light from the laser array projector 1400 enters the distribution waveguide 1500 at entrance point and exits the waveguide 1500 at corresponding exit points. In some embodiments, the entrance and exit points may be implemented as holograms using a holographic film. Alternatively, the entrance and exit points may be implemented as surface relief gratings (SRG), which are typically created using lithographic techniques rather than a holographic film. The laser diodes in the projector 1400 each line up with one of the entrance holograms of the distribution waveguide 1500, and each laser diode is configured to project light into its corresponding entrance hologram. The waveguide 1500 is configured to guide the light emitted by the laser diodes from their respective entrance holograms to respective exit holograms.

In some embodiments, assuming a light engine with four peripheral and four foveal projectors as shown in FIG. 8, there are twelve (four of each color) entrance holograms on distribution waveguide 1500 for each of the four foveal projectors (48 total), and three (one of each color) entrance holograms on distribution waveguide 1500 for each of the four peripheral projectors (12 total). Likewise, there are twelve (four of each color) exit holograms on distribution waveguide 1500 for each of the four foveal projectors (48 total), and three (one of each color) exit holograms on distribution waveguide 1500 for each of the four peripheral projectors (12 total). As shown in FIG. 15, in some embodiments, there may be four peripheral exit points corresponding to the peripheral projectors, each peripheral exit point including one red, one green, and one blue peripheral exit hologram for the respective peripheral projector, and sixteen foveal exit points, each foveal exit point including one red, one green, and one blue foveal exit hologram. The foveal exit points may be arranged in clusters of four; thus there are four clusters corresponding to the four foveal projectors. Note that exit holograms for red, green, and blue light may be overlaid or stacked at each foveal and peripheral exit point.

Light exiting the peripheral exit points and clusters of foveal exit points of the distribution waveguide 1500 enters 2D scanning microelectromechanical systems (MEMS) mirrors (also referred to as scanning mirrors). In some embodiments, there may be two scanning mirrors for foveal projection, with a first scanning mirror for two of the foveal projectors, and a second scanning mirror for the other two foveal projectors. In some embodiments, there may be two scanning mirrors for peripheral projection, with a first scanning mirror for two of the peripheral projectors, and a second scanning mirror for the other two peripheral projectors.

Figure 16:
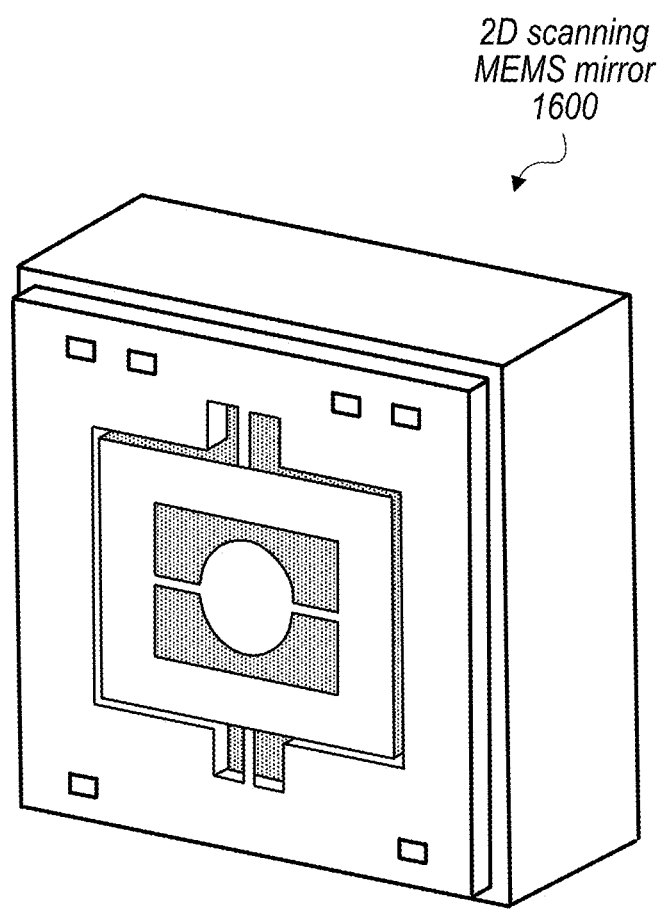
FIG. 16 illustrates a 2D scanning microelectromechanical systems (MEMS) mirror, according to some embodiments.

FIG. 16 illustrates a 2D scanning microelectromechanical systems (MEMS) mirror 1600, according to some embodiments. In some embodiments, a light engine may include four scanning mirrors, with two used for foveal projection, one mirror 1600 for each pair of foveal projectors, and two used for peripheral projection, one mirror 1600 for each pair of peripheral projectors. In some embodiments, each scanning mirror 1600 operates at a resonant frequency of 22 kHz. However, scanning mirrors 1600 with other resonant frequencies may be used, for example mirrors 1600 that operate at a resonant frequency of 30 kHz or higher for fast axis scans. Note that using mirrors 1600 that operate at a resonant frequency higher than 22 kHz (e.g., 30 kHz) may allow a reduction from four laser diodes per color per foveal projector down to two laser diodes per color per foveal projector. Thus, the laser array projector as illustrated in FIGS. 15 and 16 may be reduced from 20 laser diodes of each color down to 12 laser diodes of each color (2 for each foveal projector and 1 for each peripheral projector), and thus from 60 laser diodes total down to 36 laser diodes total, with corresponding changes in the configuration of the distribution waveguide 1500.

Light exiting the scanning mirrors enters corresponding foveal and peripheral optical waveguides. In some embodiments, there may be two waveguides for foveal projection, with a first waveguide for two of the foveal projectors, and a second waveguide for the other two foveal projectors. In some embodiments, there may be four waveguides for peripheral projection, with a peripheral waveguide for each of the peripheral projectors.

Figure 17:
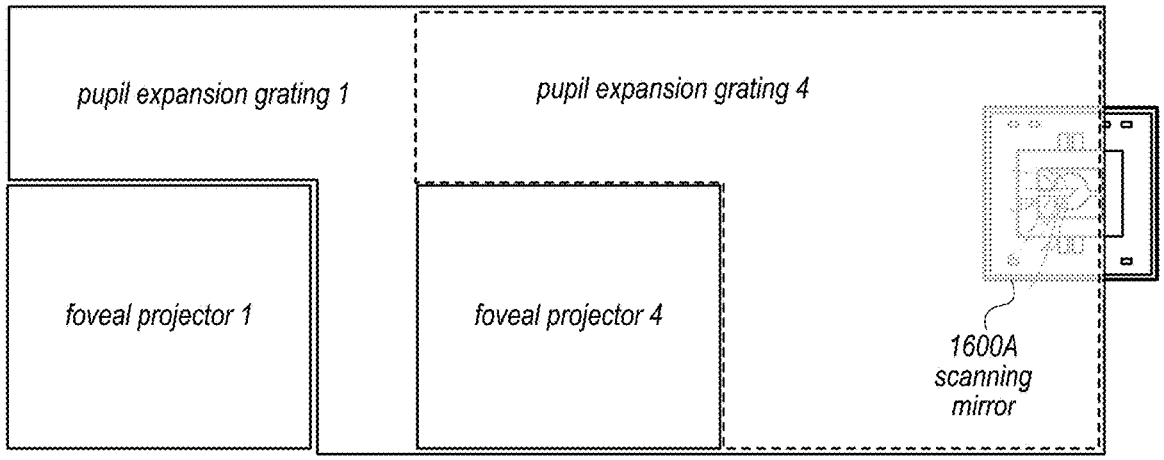
FIG. 17 illustrates foveal waveguides, according to some embodiments.
Figure 17:
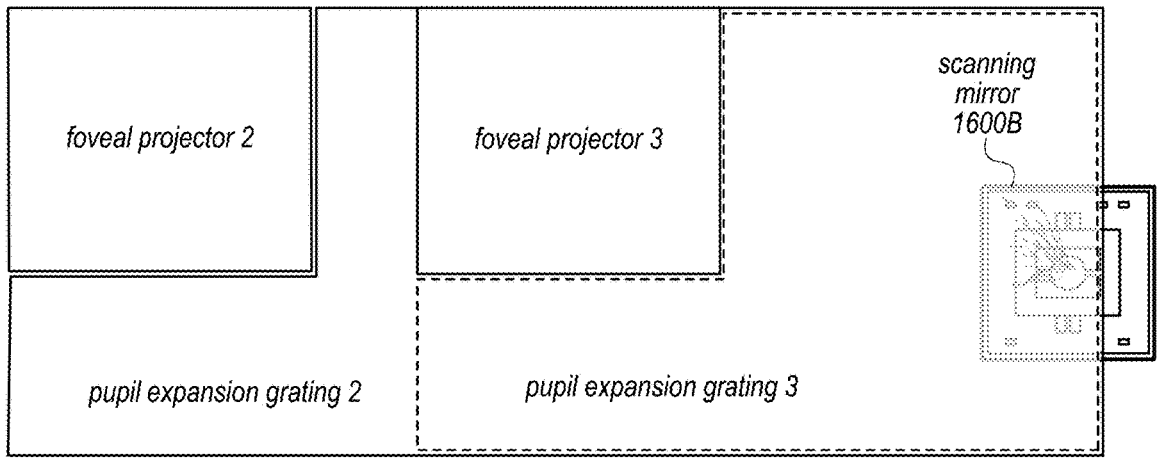
Figure 17:
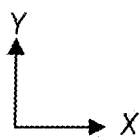
Figure 17:
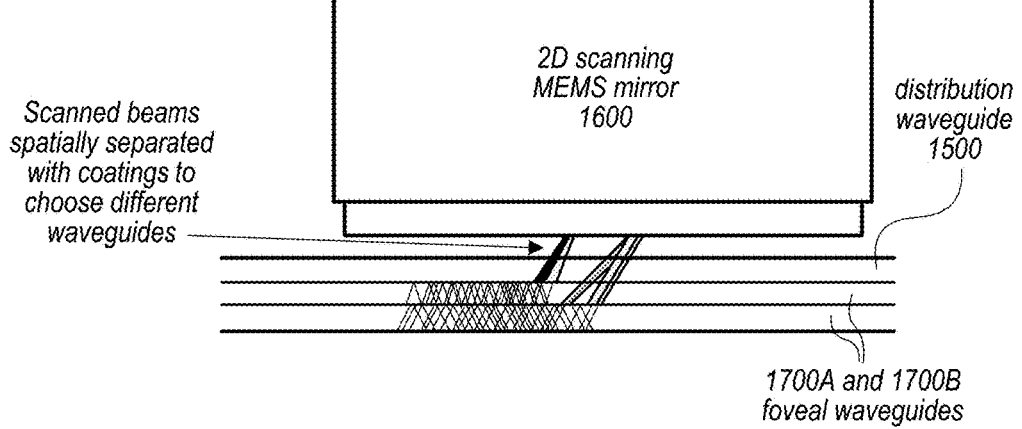

FIG. 17 illustrates layered foveal waveguides with pupil expansion, according to some embodiments. There may be two 2D scanning MEMS mirrors 1600 for foveal projection, each scanning light from the distribution waveguide into pupil expansion gratings of a respective foveal optical waveguide 1700 for a pair of foveal projection points (foveal projectors). For example, scanning mirror 1600A scans for foveal projectors 1 and 4 on foveal waveguide 1700A, and scanning mirror 1600B scans for foveal projectors 2 and 3 on foveal waveguide 1700B. As previously noted, each foveal projector may be illuminated by 12 laser diodes of the light engine; the 12 laser diodes include 4 laser diodes of each color/wavelength (red, green, and blue (RGB)). Using 4 laser diodes for each color to illuminate a foveal projector may reduce the required scan angle of the scanning MEMS mirrors 1600, and hence reduce the mirror speed required when scanning pixels. Higher mirror speeds may tend to smear pixels, which reduces resolution.

In some embodiments, the gratings on the foveal waveguides 1700 have vertical grating vectors (in the +Y direction). In some embodiments, the gratings have a 700 nm grating spacing and allow diffraction in the +1, 0 and −1 diffraction orders. In some embodiments, there is no pupil expansion grating on one side of the exit gratings at the foveal projectors, and so the projected beams from the MEMS mirrors 1600 are not at the required elevation angles (azimuth scan angles are correct). Hence, the exit aperture may also require a weak grating to correct the elevation angles.

In some embodiments, for projectors 1 and 4, all 0 order beams are angled downwards; for projectors 2 and 3, all 0 order beams are angled upward. This allows the output aperture to be filled. However, this may depend on the grating efficiencies for the different orders, which ideally needs to vary across the pupil expansion grating.

In some embodiments, the pupil expansion gratings operate by diffracting light into the different orders (−1, 0, +1) as the light propagates towards the output grating; however, to exit, the light must be at order 0, meaning light must have diffracted in the +1 direction the same number of times it diffracted in the −1 direction. Light that does not meet this condition will not emerge from the exit grating.

In some embodiments, each exit grating has a spacing of 5000 nm. Projectors 1 and 4 diffract into the +1 order. Projectors 2 and 3 diffract into the −1 order.

Figure 18:
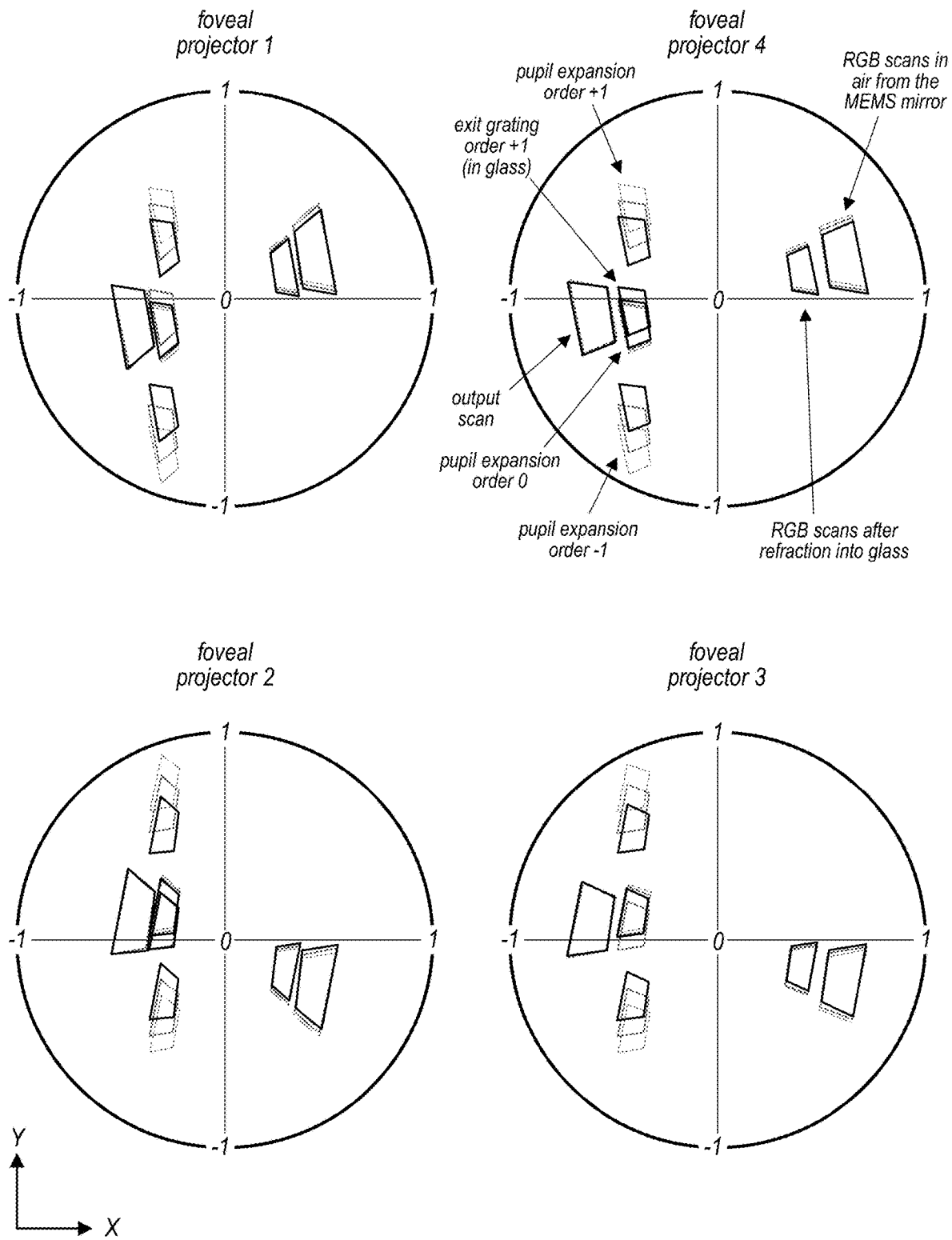
FIG. 18 illustrates beam angles in cosine space for foveal waveguides, according to some embodiments.

FIG. 18 illustrates beam angles in cosine space for a foveal waveguide as illustrated in FIG. 17, according to some embodiments. The diagrams show the beam angles in cosine space as they propagate through the foveal waveguide. Since there is an exit grating that is not matched elsewhere, the three colors diffract differently. Hence to compensate, the input scan onto the MEMS mirror may be at different angles for the three colors. The output scan should have RBG correctly aligned. Since the pupil expansion diffractions into the +1 and −1 orders do no overlap the 0 order, there is no possibility of light from these orders entering the eye in the projected FOV.

Figure 19:
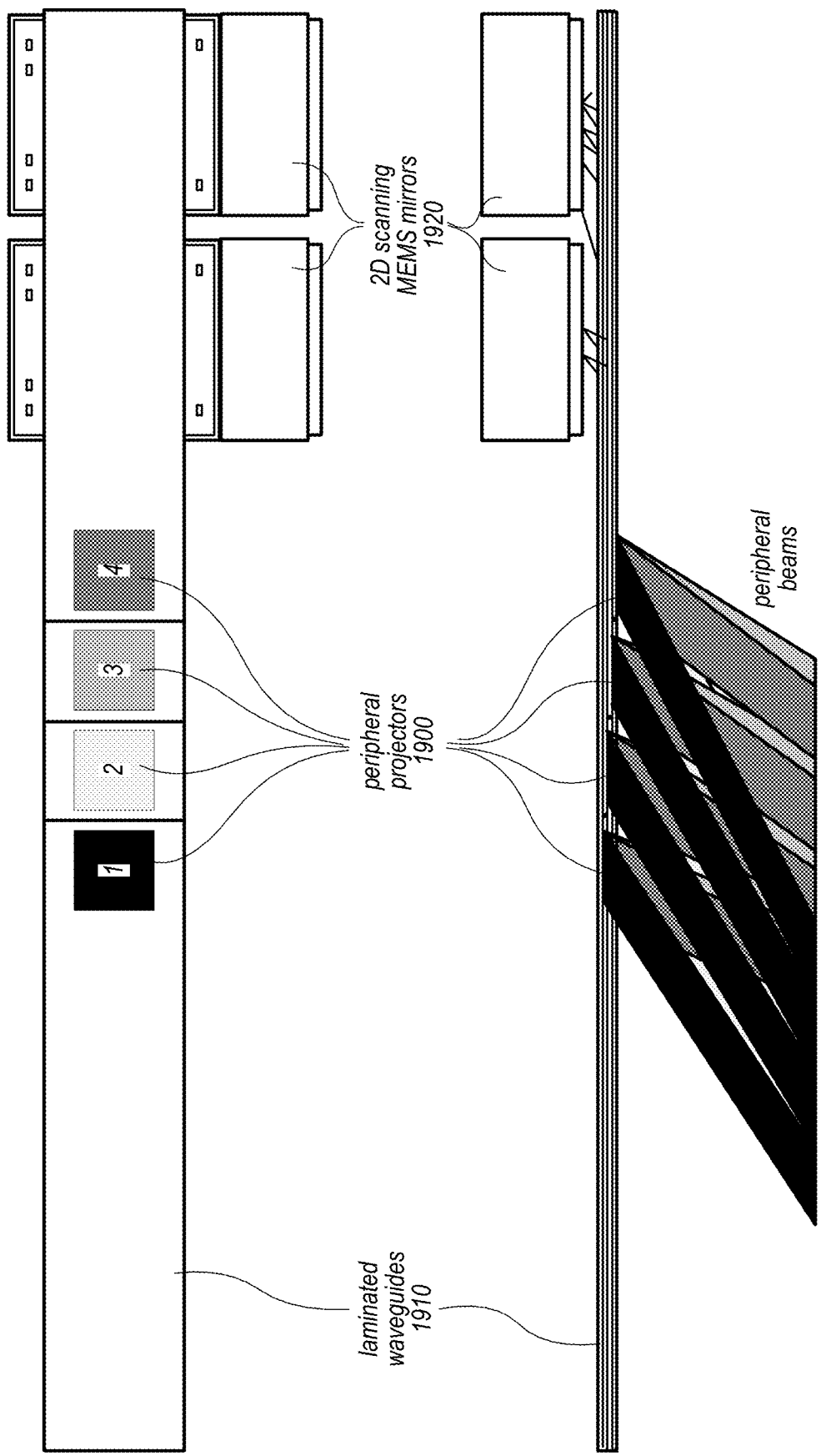
FIG. 19 illustrates peripheral waveguides, according to some embodiments.

FIG. 19 illustrates peripheral waveguides, according to some embodiments. In some embodiments, there may be four (e.g., 100 um thick) peripheral waveguides 1910 laminated together. In some embodiments, there may be two 2D scanning MEMS mirrors 1920 for peripheral projection, each scanning light from the distribution waveguide into pupil expansion gratings of two of the waveguides 1910. In some embodiments, the scanned rays from each mirror 1920 are spatially separated to ensure they can be directed into the correct waveguide 1910, for example using appropriate coatings. In some embodiments, there is only one diffraction grating per waveguide (a pupil expansion grating). In some embodiments, there may be coatings between the layered waveguides 1910 where needed to ensure that light is captured. In some embodiments, there are apertures in the layered waveguides 1910 at the exit to let light out. In some embodiments, the gratings for the four peripheral projectors 1900 are identical. Hence, depending on the manufacturing process, it may be possible to record all the gratings (holograms) at the same time. In some embodiments, all of the gratings have a grating vector in the +Y direction, with a grating spacing of 700 nm. Diffraction is allowed into the +1, 0 and −1 orders. In some embodiments, all light enters and exits at the same angle. Light can only escape if diffracted into the +1 order the same number of times as the −1 order.

Figure 20:
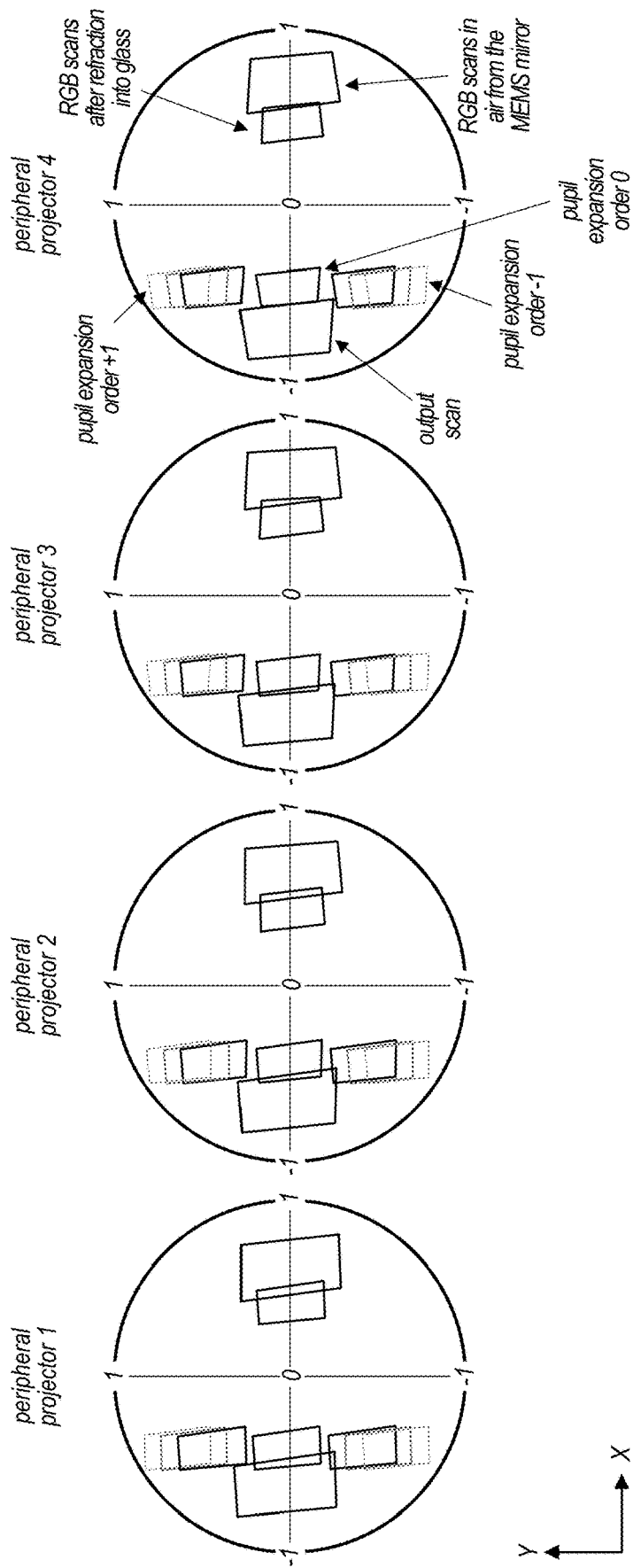
FIG. 20 illustrates beam angles in cosine space for peripheral waveguides, according to some embodiments.

FIG. 20 illustrates beam angles in cosine space for peripheral waveguides, according to some embodiments. In some embodiments, the pupil expansion grating spacing and scan range may be optimized to ensure that all scan angles can diffract into the +1 and −1 orders, and that the +1 and −1 orders do not overlap with the 0 order.

Figure 21:
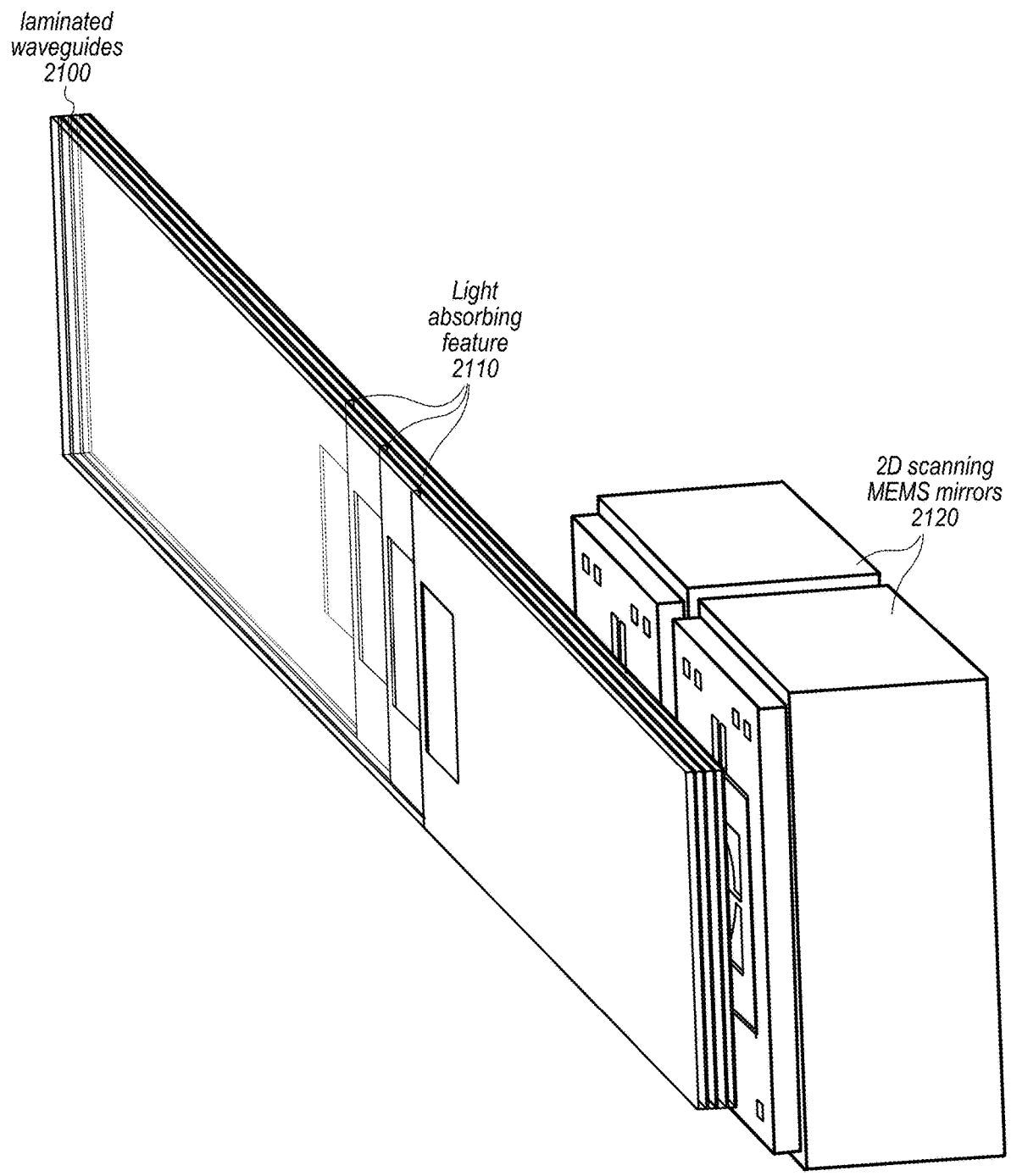
FIG. 21 further illustrates peripheral waveguides, according to some embodiments.

FIG. 21 further illustrates peripheral waveguides, according to some embodiments. In some embodiments, there may be four peripheral waveguides 2100 laminated together. Each peripheral waveguide may have an HOE layer recorded with the pupil expansion grating. In some embodiments, there may be coatings between the layers to prevent light from traveling between the waveguides 2100 except at the input and output apertures. In some embodiments, the layered waveguides 2100 may include a light absorbing feature that separates light from each waveguide at the output apertures.

Holographic Combiner Details

Figure 22A:
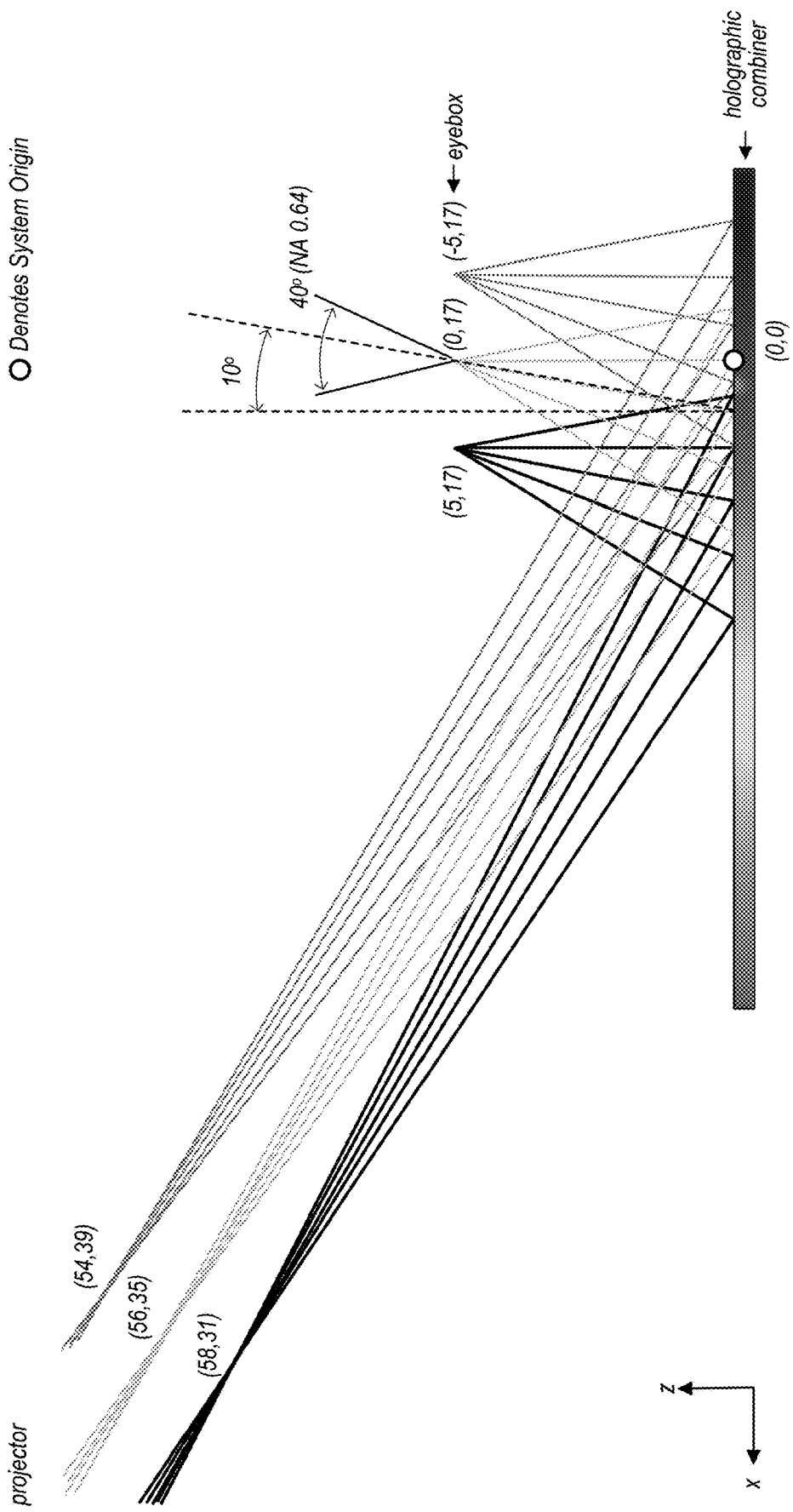
FIGS. 22A through 22C are graphs illustrating angular selectivity for a holographic combiner, according to some embodiments.
Figure 22B:
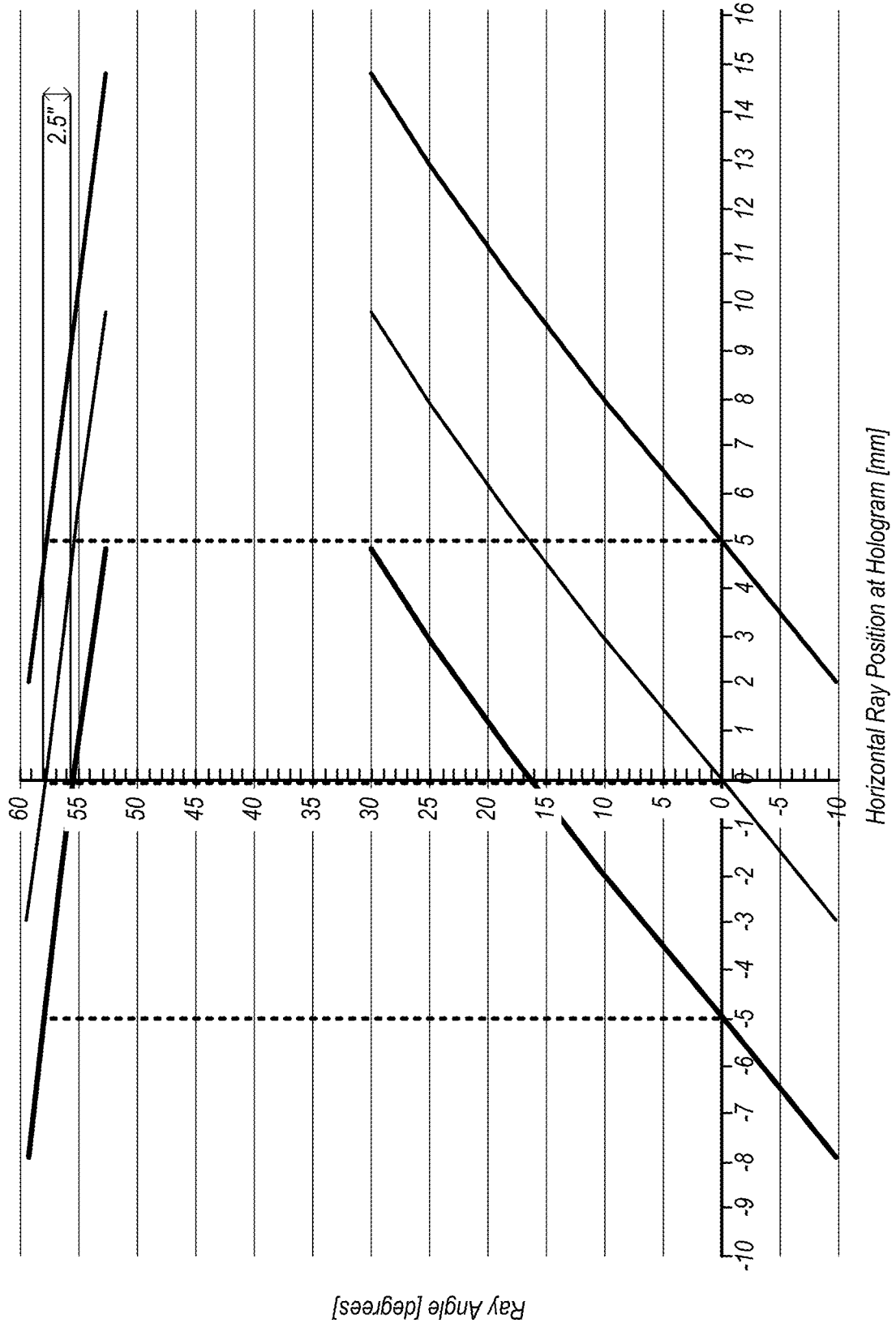
Figure 22C:
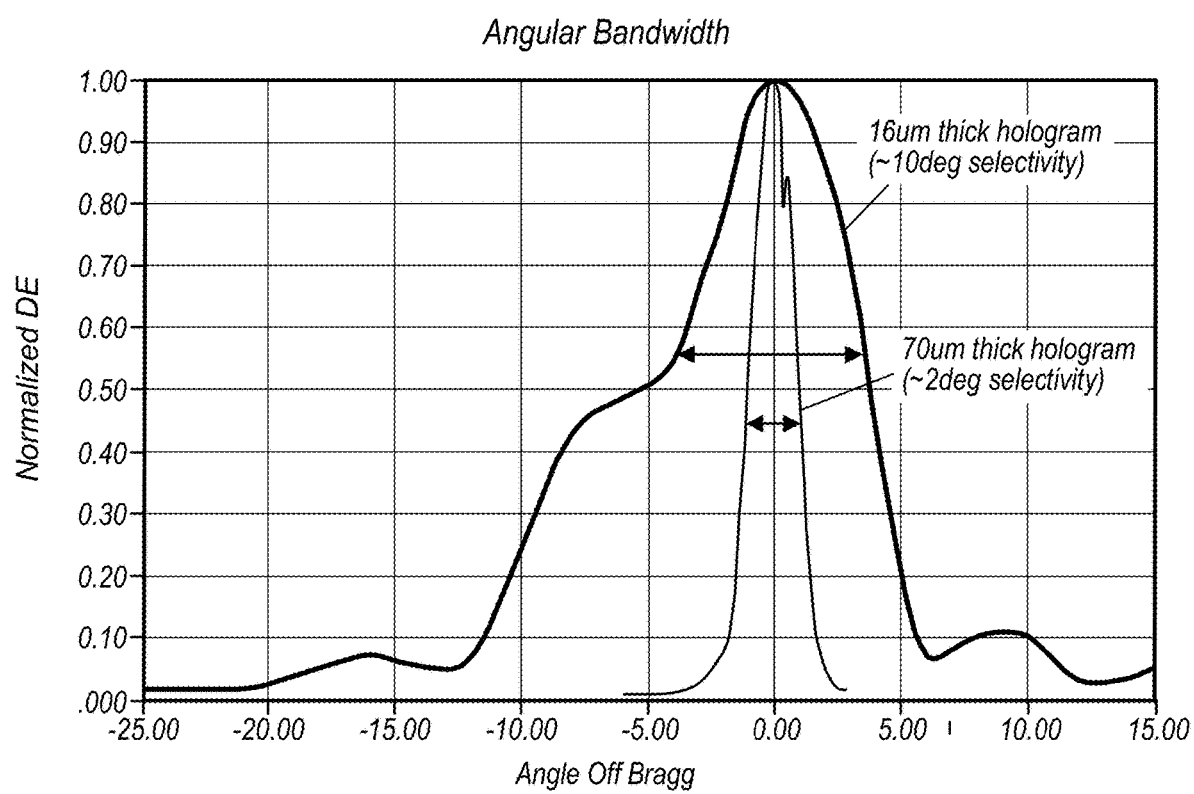

FIGS. 22A through 22C are used to illustrate aspects of using a holographic combiner rather than a reflective mirror as shown in FIG. 4 which will take light from any angle and deflect it in a certain direction. In some embodiments, to simplify the AR system, rather than maneuvering the light around with a secondary scanning mirror as shown in FIG. 4, the AR system projects from a given projection point onto multiple points in the eyebox. In that way, the mechanics of the system can be simplified when compared to the system of FIG. 4, while also delivering a large eyebox that is tolerant to different people's face geometry and different eye positions.

FIGS. 22A through 22C are graphs illustrating angular selectivity for a point-to-point holographic combiner, according to some embodiments. In some embodiments, peripheral projector angular selectivity may be >1.6 deg and <2.2 deg. However, this may be altered depending on constraints. In some embodiments, foveal projector (with larger diameter beams) angular selectivity may be >7.1 deg and <8.6 deg. The constraints are different because the beam sizes are different. In some embodiments, angular selectivity for a holographic element may be altered by adjusting its film thickness so that it behaves more or less like a volume hologram.

FIG. 22A shows light from three different projection points projecting onto the holographic combiner; holograms on the combiner redirect the light to three different points in the eyebox. Because of eye movement, rotation, pupil spacing, etc., the pupil of the subject's eye may be at different points in the eyebox. The AR system as described herein may be able to identify the location of the subject's pupil in the eyebox (e.g., using gaze tracking technology), and selectively project light onto those different points in the eyebox.

In some embodiments, to accomplish this, a series of holograms are recorded onto the holographic combiner that are configured to redirect light from particular projection points to particular points in the eyebox. Thus, light can be directed to particular eyebox points by emitting light from different projection points.

FIG. 22B shows graphically some implications of different projection points. For a given point on the holographic combiner, respective holograms need to be selective enough so that if the projection angle is changed, the light will be diffracted from one hologram, or another, or the next. Point-to-point holograms have selectivity, as illustrated in FIG. 22C which specifically addresses a relationship between thickness and selectivity of holograms. A thin hologram may be very similar to a regular surface diffraction grating, which will diffract light coming in at any angle, and diffract it into another angle. However, thicker holograms become more like a volume hologram, and can be programmed such that only light from a certain angle gets diffracted; light outside that angular range passes through. Generally, the thicker the hologram, the more selective for angle. Thus, the thickness of a hologram is highly influential in terms of the angular selectivity.

Based on the above analysis, and referring again to FIG. 22A, the actual differences between angles between the rays from the three projection points is roughly 2-2.5 degrees as the rays move from those projection points, as illustrated in FIG. 22B. The holographic combiner's holograms need to be sensitive enough so that they distinguish between the different projection points and project light in the right direction. Thus, in some embodiments, based on the analysis of FIG. 22C, something in the order of a 70 micron thick hologram may be used so that the angular selectivity that is needed is achieved by the holographic combiner.

Figure 23:
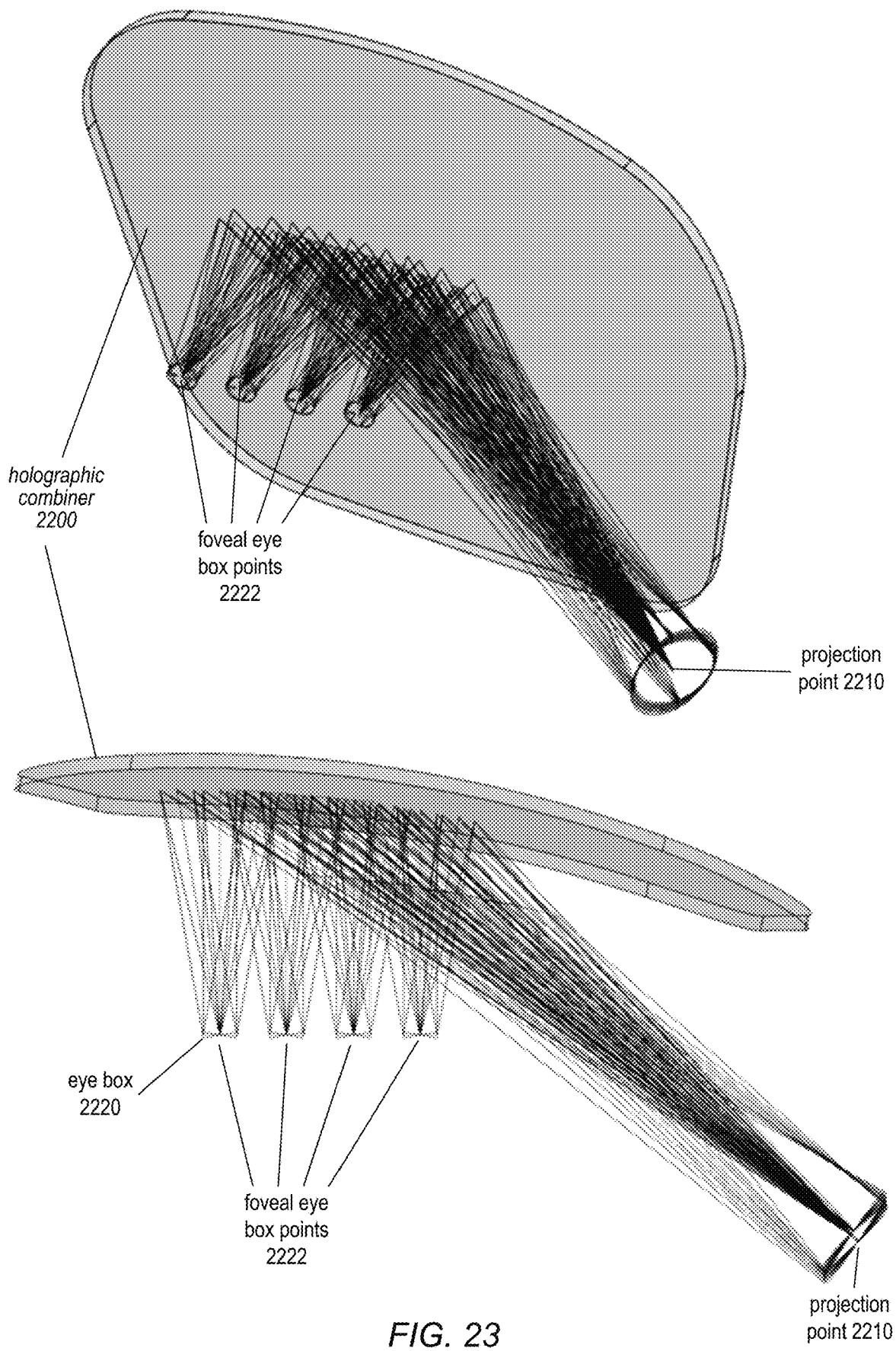
FIG. 23 illustrates foveal projections for a holographic combiner, according to some embodiments.

FIG. 23 illustrates foveal projections for a holographic combiner, according to some embodiments. Four foveal eye box points are shown illuminated at the same time from a single foveal projection point. However, in some embodiments, two or three rows of foveal eye box points (i.e., 8 or 12 eye box points) may be simultaneously illuminated from a single foveal projection point.

Figure 24:
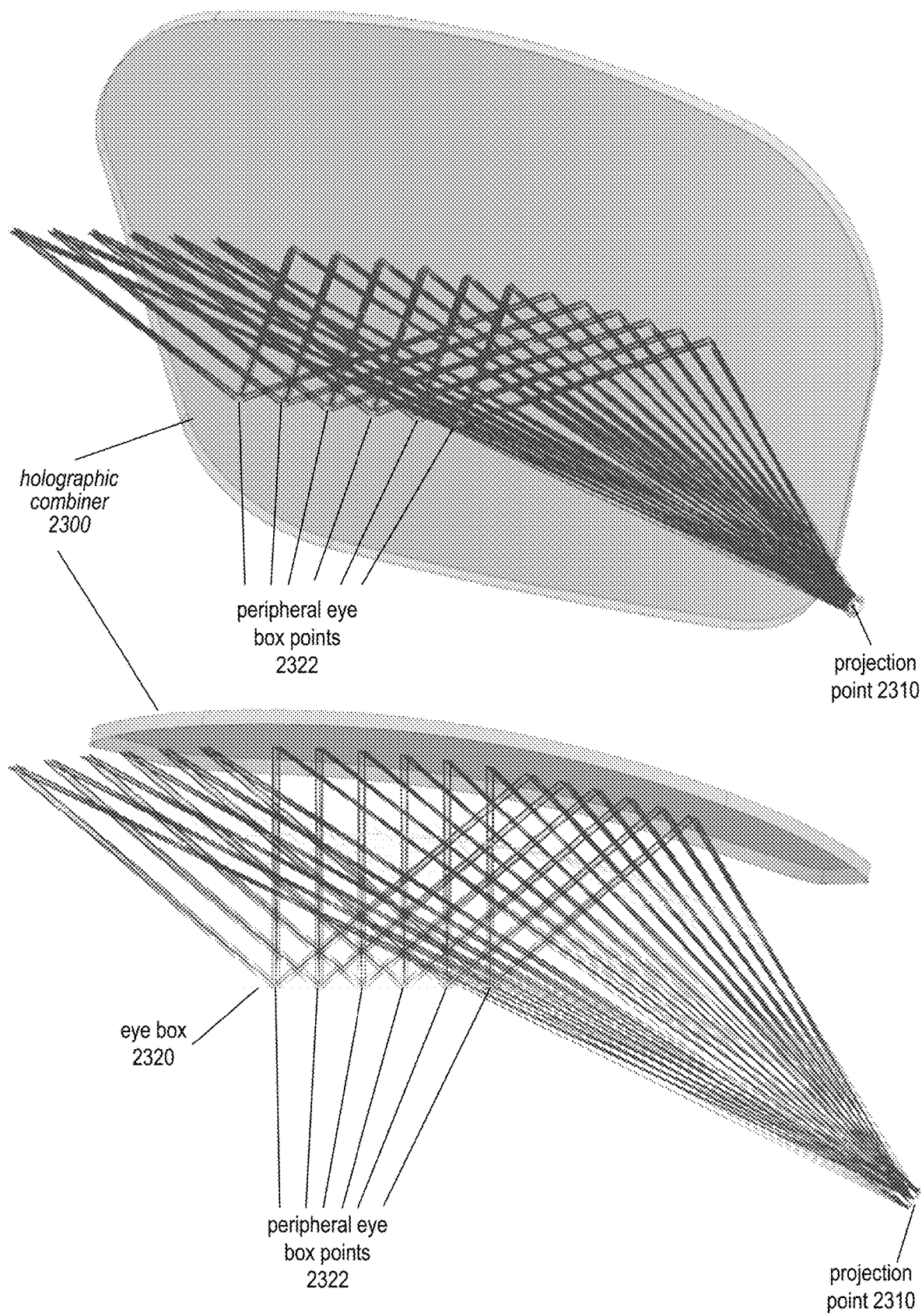
FIG. 24 illustrates peripheral projections for a holographic combiner, according to some embodiments.

FIG. 24 illustrates peripheral projections for a holographic combiner, according to some embodiments. Six peripheral eye box points are shown illuminated at the same time from a single peripheral projection point. However, in some embodiments, three or four rows of peripheral eye box points (i.e. 18 or 24 eye box points) may be simultaneously illuminated from a single peripheral projection point.

FIGS. 25 through 28 illustrate beam focusing in an AR system, according to some embodiments. As previously mentioned, because the holographic combiner has optical power, the beams of light that are projected by the light engine may need to be focused. A projector projects onto multiple eyebox points at the same time. However, the beam focus required for the different eyebox points is different.

Figure 25:
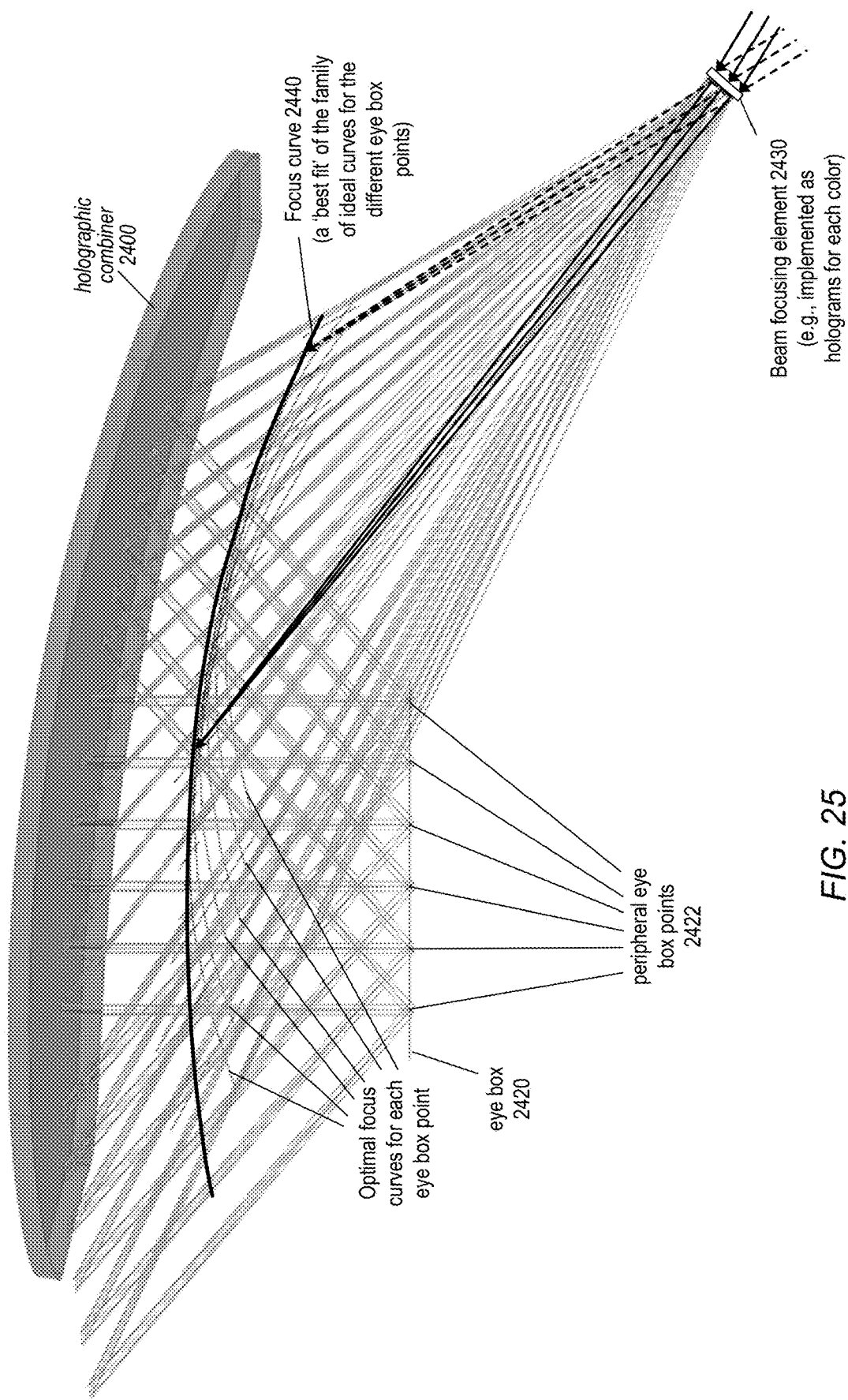
FIG. 25 illustrates a best fit focus curve and a focusing element for peripheral projections in an AR system, according to some embodiments.

FIG. 25 illustrates a best fit focus curve and a focusing element for peripheral projections in an AR system, according to some embodiments. FIG. 25 shows that there are optimal or ideal focus curves for each peripheral eye box point 2422. However, in some embodiments, a beam focusing element 2430 (e.g., implemented as an optical lens or alternatively as holograms for each color) may be used to focus beams from peripheral projection points at a focus curve 2440 that is a 'best fit' of the family of ideal focus curves for the different peripheral eye box points. In some embodiments, the focus curve 2440 may be "best fit" to provide optimal resolution and less error at the middle of the FOV. More error and lower resolution can be tolerated at the edge of the FOV than at the middle of the FOV. Thus, the best fit focus curve 2440 forms the ideal image plane for a notional lens. Beam focusing element 2430 focuses the light at best fit focus curve 2440 as the light is scanned across an angle.

In some embodiments, the beam focusing element 2430 may be implemented as a planar holographic optical element. Beam focusing element 2430 may thus be effectively a single component which can be recorded at different spatial points with different holograms for the different projectors. In some embodiments, there are eight projectors, four foveal and four peripheral projectors; over the respective projectors, beam focusing element 2430 will be recorded with holograms that will act as lenses. Thus, beam focusing element 2430 may act as a lens which changes focus position as light is scanned across the element.

Note that there are errors between the best fit curve 2440 and the optical focus curves. In some embodiments, to address these errors, the beam diameter may be changed as light is scanned across the element. As the beam diameter is changed, this effectively changes the F-number of the system as light enters the eye. As the beam diameter is reduced, the F-number is increased, which increases the depth of focus of the system. Increasing the depth of focus compensates for the errors in focusing which may result from the errors between the best fit curve 2440 and the optical focus curves.

Figure 26:
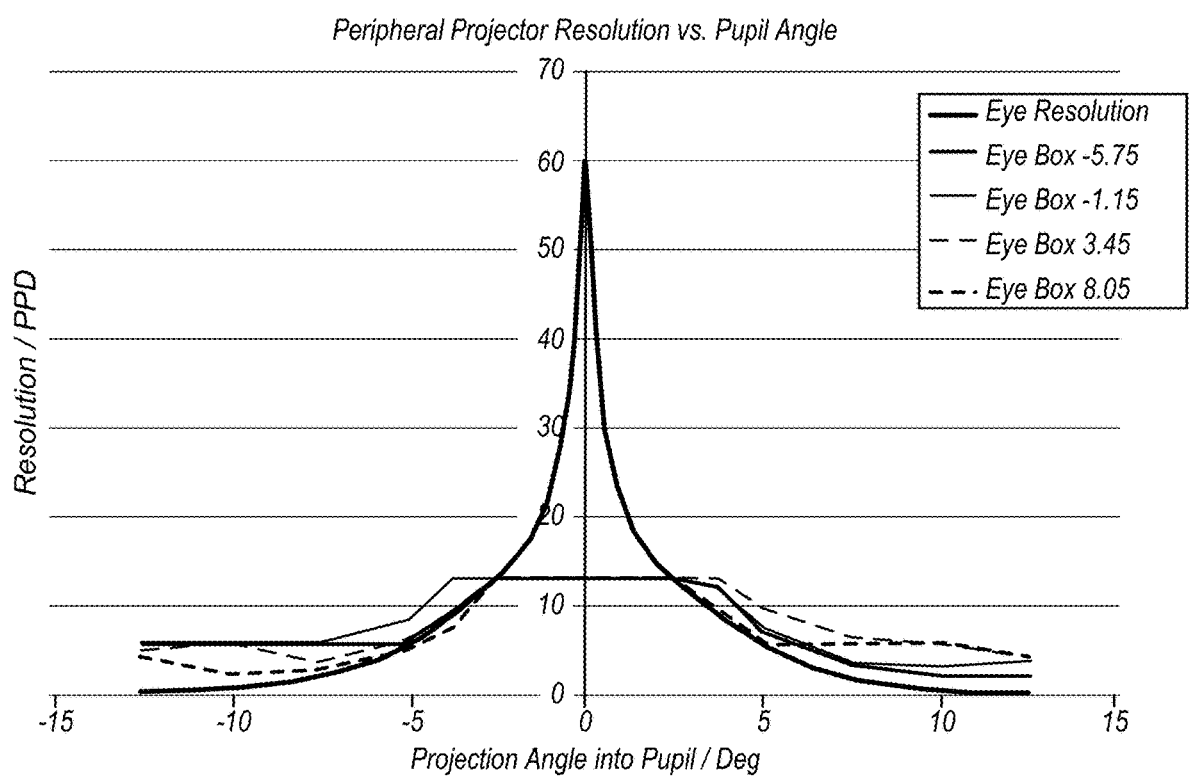
FIG. 26 is a graph of peripheral projector resolution vs. pupil angle in an AR system, according to some embodiments.

FIG. 26 is a graph of peripheral projector resolution vs. pupil angle in an AR system, according to some embodiments. The graph represents an analysis using four eye box points across the eye box from a given projector point. However, other numbers of eye box points (e.g., six) may be used, and a similar analysis may be done using that other number of eye box points.

As can be seen in FIG. 26, there are errors between the ideal beam focus for any given eye box position and the 'best fit' curve, which represents the actual beam focus. In some embodiments, the errors can be compensated by adjusting the beam diameter for different field angles, so as to increase the depth of focus by increasing the F-number. In some embodiments, this may be done discretely with the beam diameter being 0.5 mm near the center of the scan reducing to 0.35 mm and then 0.22 mm at the extreme ends of the scan. In this way the resolution is optimized and gracefully reduces at higher angles. As can be seen in FIG. 26, it is possible to realize the peripheral projector with a resolution that remains competitive with what the eye can actually resolve at higher field angles.

In FIG. 26, the black line represents eye resolution and how that changes over the FOV. The point in the middle represents foveal resolution; resolution drops off at higher field angles. For peripheral projection, it may not be necessary to project light at high resolutions at the small angles; instead, a goal is to project light over a much bigger FOV. FIG. 26 illustrates what happens, when the beam diameter is reduced at higher field angles to compensate for the focusing errors as described above. There is a reduction in resolution at higher field angles (all lines are dropping), but for the most part stay above eye resolution. Thus, errors in focal position can be compensated by altering the beam diameter as light is scanned. In some embodiments, to alter the beam diameter, holograms that reject light at different angles may be used to provide an effective aperture as the light is scanned.

Figure 27:
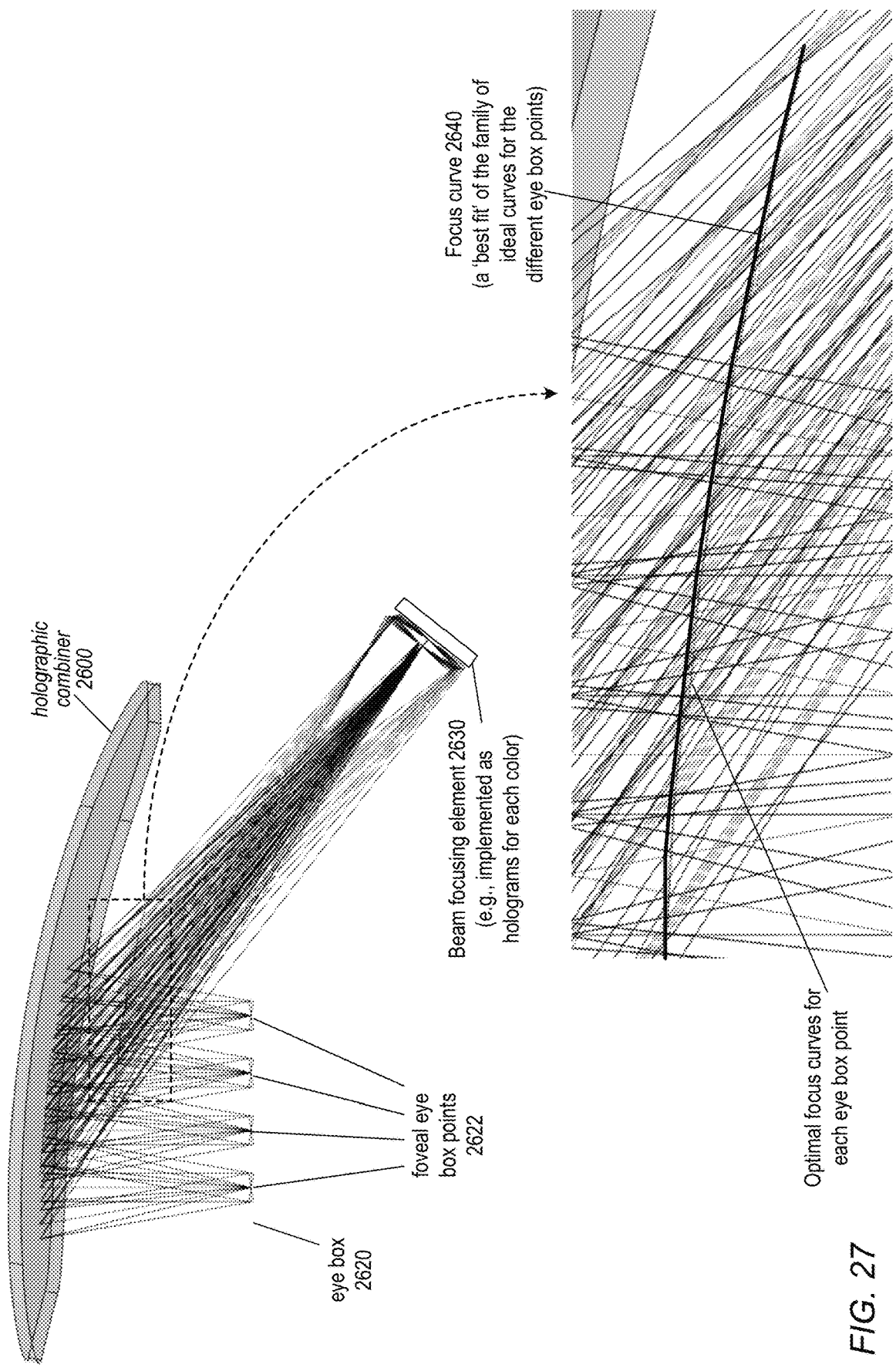
FIG. 27 illustrates a best fit focus curve and a focusing element for foveal projections in an AR system, according to some embodiments.

FIG. 27 illustrates a best fit focus curve and a focusing element for foveal projections in an AR system, according to some embodiments. FIG. 27 shows that there are optimal or ideal focus curves for each foveal eye box point 2622. However, in some embodiments, a beam focusing element 2630 (e.g., implemented as an optical lens or alternatively as holograms for each color) may be used to focus beams from foveal projection points at a focus curve 2640 that is a 'best fit' of the family of ideal focus curves for the different foveal eye box points. In some embodiments, the focus curve 2640 may be "best fit" to provide optimal resolution and less error at the middle of the FOV. The best fit focus curve 2640 forms the ideal image plane for a notional lens. Beam focusing element 2630 focuses the light at best fit focus curve 2640 as the light is scanned across an angle. Note that the best fit curve is generally closer to the optical curves and errors between the best fit curve and the family of optical curves for foveal each eye box points are smaller than those for peripheral eye box points because the field of each eye box is smaller and scan angles are smaller. However, errors are more significant for foveal projection as higher resolution is needed.

Figure 28:
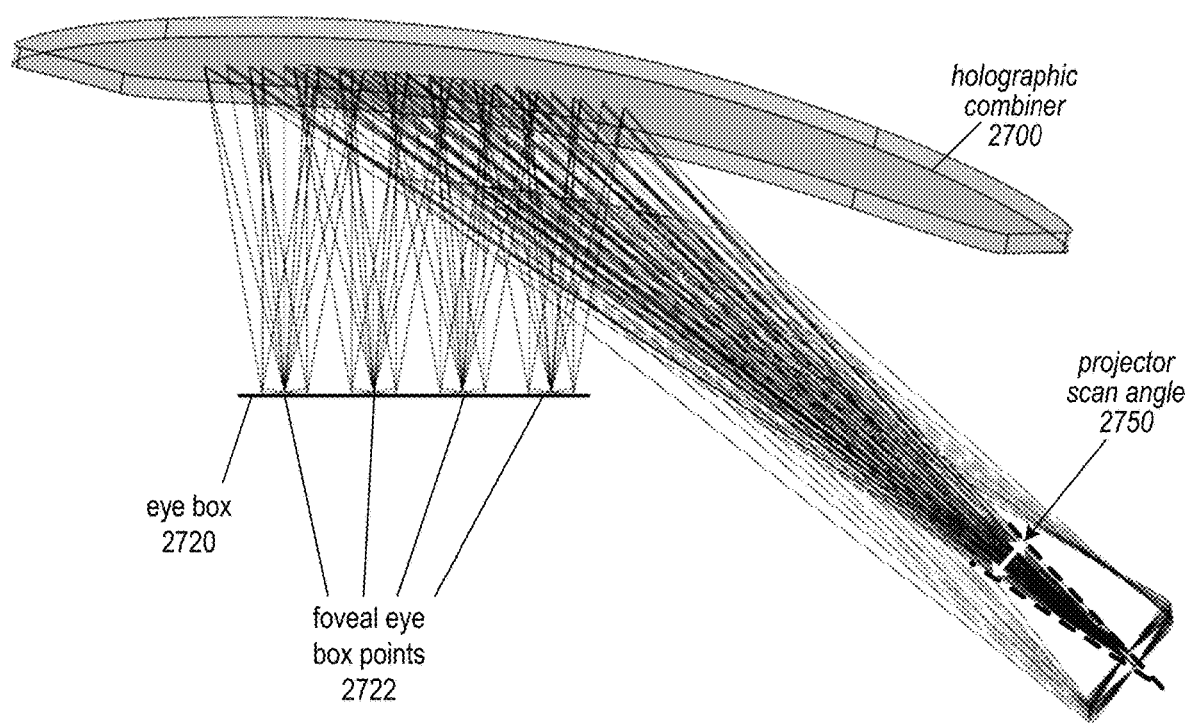
FIG. 28 illustrates projector scan angle for foveal projections, according to some embodiments.

FIG. 28 illustrates projector scan angle for foveal projections, according to some embodiments. FIG. 29A is a graph of foveal projector resolution vs. pupil angle in an AR system, according to some embodiments. FIG. 29B is a graph of beam diameter for foveal projections in an AR system, according to some embodiments. As with the peripheral projector, it may be necessary to reduce the beam diameter at the edges of the scan for each foveal eye box point, for example from 2.3 mm at the center of the scan to a minimum 0.73 mm for a particular range of scan angles. The optimal resolution may require bands of different beam diameters across the projector scan range. In some embodiments, coatings on the foveal projectors may be used to achieve this adjustment of beam diameter with field angle. In some embodiments, the coatings may be part of a further layer laminated to the waveguide structure of the light engine.

As shown in FIG. 29B, in some embodiments, when scanning through the angles in foveal projection, there will be a "sawtooth" change in beam diameter. In peripheral projection, the beam diameter can be tailed off at higher angles; for foveal projection, instead, scanning goes through a series of steps, with a large (e.g., 7 mm) beam at the middle of each scan, but tailing off at bigger angles. As shown in FIG. 29A, foveal projection is thus constantly above actual eye resolution over the angles of interest, up to 10 degrees, and thus the desired resolution can be achieved.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:
1. A system, comprising:
a controller;
a light engine including a distribution waveguide configured to receive light beams from a plurality of light sources at a plurality of entrance points and direct the light beams to pass through the distribution waveguide to a plurality of exit points to project the light beams from a plurality of projection points under control of the controller; and a reflective holographic combiner comprising a plurality of point-to-point holograms configured to redirect light received from the plurality of projection points to a plurality of eye box points;

wherein each projection point projects light beams simultaneously to two or more of the plurality of holograms, wherein the two or more holograms redirect the light beams to illuminate two or more respective eye box points;

wherein the holograms are configured such that neighboring eye box points are illuminated by different ones of the holograms, and wherein the entrance points and exit points of the distribution waveguide are implemented as holograms using a holographic film or as surface relief gratings.

2. The system as recited in claim 1, wherein the plurality of eye box points includes foveal and peripheral eye box points, and wherein the plurality of projection points includes:

two or more foveal projectors configured to project wide diameter light beams over a small field of view, wherein foveal light beams are redirected to illuminate foveal eye box points; and two or more peripheral projectors configured to project narrow diameter light beams over a wide field of view, wherein peripheral light beams are redirected to illuminate peripheral eye box points.

3. The system as recited in claim 2, wherein the diameters of the foveal light beams are 4 mm or greater when exiting the foveal projectors.

4. The system as recited in claim 2, wherein the diameters of the foveal light beams are 2.3 mm or less at the foveal eye box points, and wherein the diameter of the peripheral light beams is 0.5 mm or less at the peripheral eye box points.

5. The system as recited in claim 2, wherein field of view of the foveal light beams is 20° horizontal×20° vertical, and wherein field of view of the peripheral light beams is 120° horizontal×74° vertical.

6. The system as recited in claim 2, wherein the light engine includes a plurality of light sources, and wherein the controller is configured to selectively activate and modulate particular ones of the plurality of light sources to project light from different ones of the foveal and peripheral projectors.

7. The system as recited in claim 6, wherein the light sources are arrays of edge-emitting laser diodes in a laser array projector component of the light engine.

8. The system as recited in claim 6, wherein the light sources include red, green, and blue light sources.

9. The system as recited in claim 1, wherein the light engine includes a plurality of scanning mirrors configured to receive light at appropriate angles and positions from the plurality of exit points and scan the light to a plurality of layered waveguides that include film layers recorded with holographic or diffractive gratings, wherein the foveal and peripheral projectors are implemented by respective foveal and peripheral waveguides of the plurality of layered waveguides.

10. The system as recited in claim 9, wherein the foveal and peripheral waveguides include pupil expansion gratings configured to expand the light received from the scanning mirrors and direct the light to the foveal and peripheral projectors, wherein the foveal and peripheral waveguides are configured to emit the expanded light from the foveal projectors.

11. The system as recited in claim 2, wherein the light engine further comprises focusing elements for each projector, wherein the focusing elements are configured to focus the light beams emitted by the projectors at focus surfaces in front of the holographic combiner so that the light beams are substantially collimated when reflected to the eye box points by the holographic combiner.

12. The system as recited in claim 11, wherein ideal focus surfaces are different for different eye box points, and wherein the light engine is configured to reduce a light beam diameter at different projection angles to compensate for errors between the focus surfaces and the ideal focus surfaces, wherein reducing the diameter of a light beam increases a F-number thus increasing a depth of focus of the light beam.

13. The system as recited in claim 11, wherein the focusing elements include holographic lenses.

14. The system as recited in claim 1, wherein the system further includes a gaze tracking component configured to track a position of a subject's eye, wherein the controller is configured to selectively activate and modulate particular ones of a plurality of light sources to selectively illuminate particular ones of the plurality of eye box points.

15. The system as recited in claim 1, wherein the light engine includes a plurality of scanning mirrors, wherein the scanning mirrors include 2D scanning microelectromechanical systems (MEMS) mirrors.

16. A method, comprising:

emitting, by a laser array projector comprising a plurality of light sources, light beams to a plurality of entrance holograms of a distribution waveguide under control of a controller;

guiding, by the distribution waveguide, the light beams to pass through the distribution waveguide from the plurality of entrance holograms to respective ones of a plurality of exit holograms of the distribution waveguide;

emitting, at the exit holograms, the light beams to a plurality of scanning mirrors;

scanning, by the scanning mirrors, the light beams to layered waveguides with pupil expansion;

expanding, by pupil expansion gratings of the layered waveguides, the light beams;

projecting, by the layered waveguides, the expanded light beams from respective ones of a plurality of projection points;

focusing, by focusing elements, the projected light beams in front of a holographic combiner; and redirecting, by a plurality of point-to-point holograms of the holographic combiner, the light beams to respective ones of a plurality of eye box points.

17. The method as recited in claim 16, wherein the plurality of eye box points includes foveal and peripheral eye box points, and wherein the plurality of projection points includes:

two or more foveal projectors configured to project wide diameter light beams over a small field of view, wherein foveal light beams are redirected by respective point-to-point holograms to illuminate foveal eye box points; and two or more peripheral projectors configured to project narrow diameter light beams over a wide field of view, wherein peripheral light beams are redirected by respective point-to-point holograms to illuminate peripheral eye box points;

wherein the diameter of the foveal light beams is 4 mm or greater when exiting the foveal projectors, wherein the diameters of the foveal light beams are 2.3 mm or less at the foveal eye box points, and wherein the diameters of the peripheral light beams are 0.5 mm or less at the peripheral eye box points.

18. The method as recited in claim 17, further comprising selectively activating and modulating, by the controller, particular ones of the plurality of light sources to project light from different ones of the foveal and peripheral projectors.

19. The method as recited in claim 16, wherein the plurality of eye box points includes foveal and peripheral eye box points, wherein the plurality of projection points includes four foveal projectors configured to project wide diameter light beams that are redirected by respective point-to-point holograms to illuminate foveal eye box points and four peripheral projectors configured to project narrow diameter light beams that are redirected by respective point-to-point holograms to illuminate peripheral eye box points.

20. The method as recited in claim 16, wherein the plurality of light sources includes red, green, and blue edge emitting lasers, wherein the plurality of light sources includes a plurality of peripheral projectors and a plurality of foveal projectors, wherein each peripheral projector is illuminated by one red, one green, and one blue laser, and wherein each foveal projector is illuminated by four red, four green, and four blue lasers.

* * * * *